US010062382B2

(12) United States Patent
Lee et al.

(10) Patent No.: US 10,062,382 B2
(45) Date of Patent: *Aug. 28, 2018

(54) OPERATING METHOD FOR MICROPHONES AND ELECTRONIC DEVICE SUPPORTING THE SAME

(71) Applicant: Samsung Electronics Co., Ltd., Suwon-si, Gyeonggi-do (KR)

(72) Inventors: Sang Hoon Lee, Yongin-si (KR); Kyung Tae Kim, Hwaseong-si (KR); Chakladar Subhojit, Suwon-si (KR); Seok Yeong Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,949

(22) Filed: Jun. 9, 2017

(65) Prior Publication Data
US 2017/0278515 A1 Sep. 28, 2017

Related U.S. Application Data

(63) Continuation of application No. 14/755,400, filed on Jun. 30, 2015, now Pat. No. 9,679,563.

(30) Foreign Application Priority Data

Jun. 30, 2014 (KR) .................. 10-2014-0080540

(51) Int. Cl.
*G06F 3/16* (2006.01)
*G10L 15/22* (2006.01)
(Continued)

(52) U.S. Cl.
CPC ............ *G10L 15/22* (2013.01); *G06F 1/3206* (2013.01); *G06F 3/165* (2013.01); *G10L 15/28* (2013.01);
(Continued)

(58) Field of Classification Search
USPC .................. 704/238, 246, 273–275
See application file for complete search history.

(56) References Cited

U.S. PATENT DOCUMENTS 6,397,186 B1   5/2002   Bush et al.
6,456,977 B1   9/2002   Wang
(Continued)

FOREIGN PATENT DOCUMENTS

JP      2004-333704 A     11/2004
JP      2005-055666 A      3/2005
(Continued)

Primary Examiner — Marcellus Augustin
(74) Attorney, Agent, or Firm — Jefferson IP Law, LLP

(57) ABSTRACT

An electronic device which includes a plurality of microphones and an audio data processing module is provided. The plurality of microphones is operatively coupled to the electronic device, and the audio data processing module is capable of being implemented with at least one processor. The audio data processing module recognizes a specified command, based on first audio data collected using a portion of the plurality of microphones and executes a function or an application corresponding to second audio data collected using all the plurality of microphones, when the specified command is recognized.

19 Claims, 9 Drawing Sheets

(51) Int. Cl.
  H04R 3/00 (2006.01)
  G06F 1/32 (2006.01)
  G10L 15/28 (2013.01)
  G10L 21/0208 (2013.01)
  G10L 15/20 (2006.01)
  G10L 21/0216 (2013.01)

(52) U.S. Cl.
  CPC .............. *H04R 3/005* (2013.01); *G10L 15/20* (2013.01); *G10L 21/0208* (2013.01); *G10L 2015/223* (2013.01); *G10L 2021/02082* (2013.01); *G10L 2021/02166* (2013.01); *H04R 2499/11* (2013.01)

(56) References Cited

U.S. PATENT DOCUMENTS

| | | | |
|---|---|---|---|
| 6,707,910 B1 * | 3/2004 | Valve | G10L 25/78 342/423 |
| 6,990,455 B2 | 1/2006 | Vozick et al. | |
| 7,080,014 B2 | 7/2006 | Bush et al. | |
| 7,552,050 B2 | 6/2009 | Matsumoto et al. | |
| 8,411,880 B2 | 4/2013 | Wang et al. | |
| 8,600,443 B2 | 12/2013 | Kawaguchi et al. | |
| 8,942,984 B2 | 1/2015 | Kim et al. | |
| 8,996,381 B2 | 3/2015 | Mozer et al. | |
| 9,639,149 B2 | 5/2017 | Kim et al. | |
| 2002/0161586 A1 | 10/2002 | Wang | |
| 2003/0033151 A1 | 2/2003 | Vozick et al. | |
| 2004/0128137 A1 | 7/2004 | Bush et al. | |
| 2004/0260549 A1 | 12/2004 | Matsumoto et al. | |
| 2009/0190769 A1 | 7/2009 | Wang et al. | |
| 2009/0265164 A1 | 10/2009 | Yoon et al. | |
| 2011/0153323 A1 | 6/2011 | Kim et al. | |
| 2012/0076316 A1 * | 3/2012 | Zhu | H04R 3/005 381/71.11 |
| 2013/0029684 A1 | 1/2013 | Kawaguchi et al. | |
| 2013/0080171 A1 | 3/2013 | Mozer et al. | |
| 2014/0207473 A1 | 7/2014 | Li et al. | |
| 2014/0222436 A1 * | 8/2014 | Binder | G06F 3/167 704/275 |
| 2014/0278391 A1 | 9/2014 | Braho et al. | |
| 2015/0116211 A1 | 4/2015 | Kim et al. | |
| 2015/0221307 A1 * | 8/2015 | Shah | G10L 15/28 704/253 |
| 2015/0379992 A1 | 12/2015 | Lee et al. | |

FOREIGN PATENT DOCUMENTS

| | | |
|---|---|---|
| WO | 01/46946 A1 | 6/2001 |
| WO | 2015/030474 A1 | 3/2015 |

* cited by examiner

OPERATING METHOD FOR MICROPHONES AND ELECTRONIC DEVICE SUPPORTING THE SAME

CROSS-REFERENCE TO RELATED APPLICATION(S)

This application is a continuation application of prior application Ser. No. 14/755,400, filed on Jun. 30, 2015, which has issued as U.S. Pat. No. 9,679,563 on Jun. 13, 2017 and claimed the benefit under 35 U.S.C. § 119(a) of a Korean patent application filed on Jun. 30, 2014 in the Korean Intellectual Property Office and assigned Serial number 10-2014-0080540, the entire disclosure of which is hereby incorporated by reference.

TECHNICAL FIELD

The present disclosure relates to a method and a device capable of operating a plurality of microphones.

BACKGROUND

With the development of digital technologies, electronic devices which perform communications and processing of personal information while moving may have launched in recent years. Such electronic devices may be developed in the form of mobile convergence.

An electronic device may include a microphone to collect audio data. The electronic device may activate the microphone to collect audio data. The electronic device may store the collected audio data or may transmit it to other electronic device.

The above-described electronic device of the related art may include one microphone. For this reason, data collected through one microphone may be information including a lot of noise. Accordingly, the electronic device of the related art may have a disadvantage in that accuracy of voice recognition of the collected audio data decreases.

The above information is presented as background information only to assist with an understanding of the present disclosure. No determination has been made, and no assertion is made, as to whether any of the above might be applicable as prior art with regard to the present disclosure.

SUMMARY

Embodiments of the present disclosure are to address at least the above-mentioned problems and/or disadvantages and to provide at least the advantages described below. Accordingly, an Embodiment of the present disclosure is to provide a microphone operating method capable of recognizing voice more accurately using a plurality of microphones and an electronic device supporting the same.

Another Embodiment of the present disclosure is to provide a microphone operating method and an electronic device supporting the same, capable of utilizing at least one of a plurality of microphones above all and operates the plurality of microphones according to a condition, thereby making it possible to use power efficiently.

In accordance with an Embodiment of the present disclosure, an electronic device is provided. The electronic device includes a plurality of microphones operatively coupled to the electronic device and an audio data processing module capable of being implemented with at least one processor. The audio data processing module is configured to recognize a specified command, based on first audio data collected using a portion of the plurality of microphones and to execute a function or an application corresponding to second audio data collected using all the plurality of microphones, when the specified command is recognized.

In accordance with another Embodiment of the present disclosure, a microphone operating method is provided. The method includes collecting first audio data using a portion of a plurality of microphones operatively coupled to an electronic device, recognizing a specified command, based on the first audio data, and executing a function or an application, corresponding to second audio data collected using all of the plurality of microphones, based on recognition of the specified command.

Other Embodiments, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other Embodiments, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
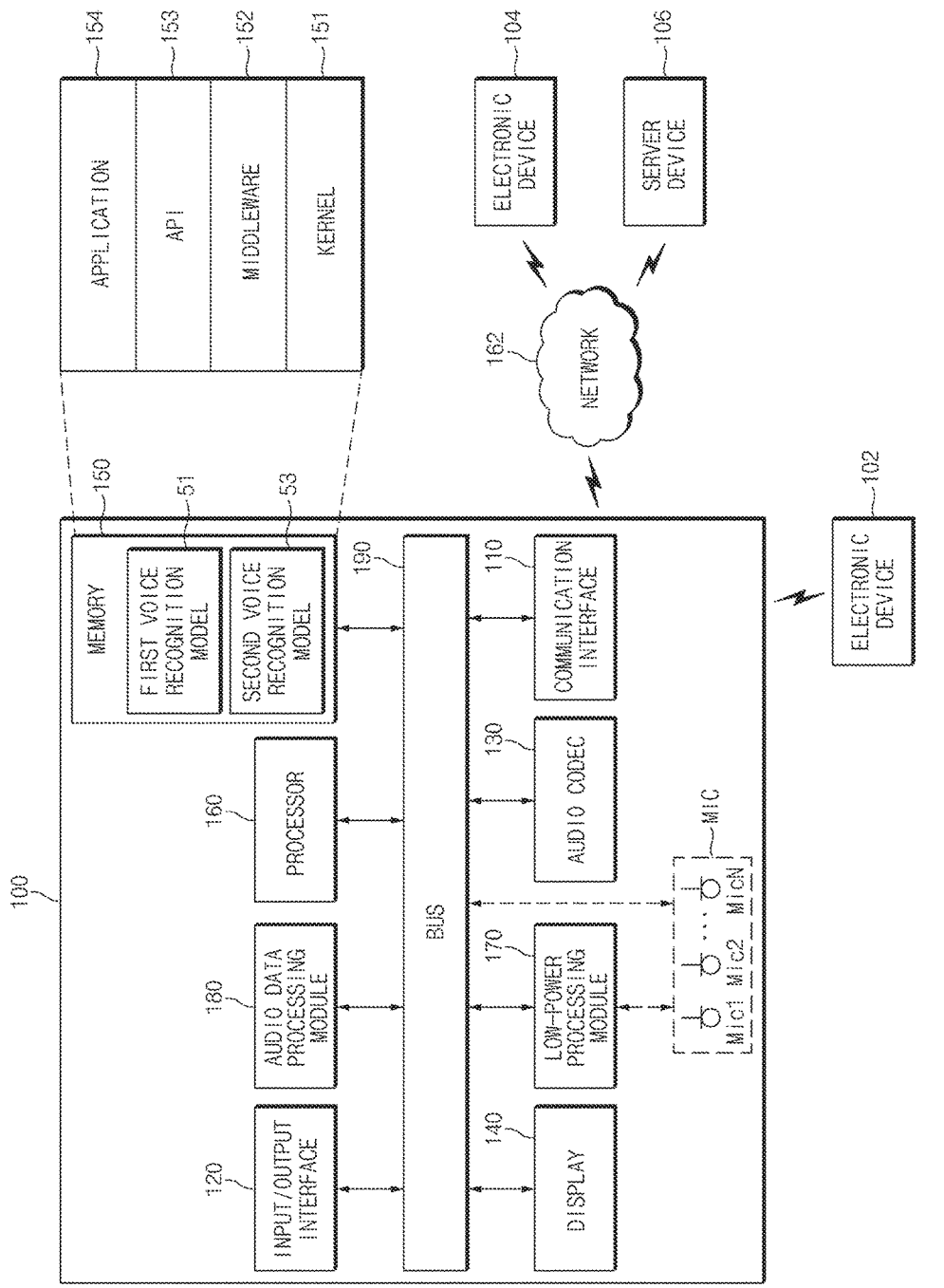
FIG. 1 illustrates an electronic device operation environment including a plurality of microphones according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, integers, operations, elements, components, or combinations thereof but does not preclude the presence or addition of one or more other features, integers, operations, elements, components, or combinations thereof.

The meaning of the term "or" or "at least one of A and/or B" used herein includes any combination of words listed together with the term. For example, the expression "A or B" or "at least one of A and/or B" may indicate A, B, or both A and B.

Terms such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. Without departing from the scope of the present disclosure, a first element may be referred to as a second element, and similarly, a second element may be referred to as a first element.

In the description below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe various embodiments of the present disclosure and are not intended to limit the scope of the present disclosure. The terms of a singular form may include plural forms unless otherwise specified.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

Electronic devices according to various embodiments of the present disclosure may include a metal case. For example, the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to various embodiments of the present disclosure, the electronic devices may be smart home appliances including metal cases. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, electronic picture frames, and the like.

According to various embodiments of the present disclosure, the electronic devices may include at least one of medical devices (e.g., a magnetic resonance angiography (MRA), a magnetic resonance imaging (MRI), a computed tomography (CT), scanners, and ultrasonic devices), navigation devices, GPS receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), and points of sales (POSs) including metal cases.

According to various embodiments of the present disclosure, the electronic devices may include at least one of parts of furniture or buildings/structures having communication functions, electronic boards, electronic signature receiving devices, projectors, and measuring instruments (e.g., water meters, electricity meters, gas meters, and wave meters) including metal cases. The electronic devices according to various embodiments of the present disclosure may be one or more combinations of the above-mentioned devices. Furthermore, the electronic devices according to various embodiments of the present disclosure may be flexible devices. It would be obvious to those skilled in the art that the electronic devices according to various embodiments of the present disclosure are not limited to the above-mentioned devices.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates an operation environment of an electronic device including a plurality of microphones according to various embodiments of the present disclosure.

Referring to FIG. 1, an electronic device operation environment may contain an electronic device 100, an electronic device 102, an electronic device 104, a network 162, and a server device 106. In the electronic device operation environment, the electronic device 100 may support voice recognition of received audio data and a function process according to the voice recognition. The electronic device 100 may include a plurality of microphones and may allow at least one of the plurality of microphones to maintain an active state. The electronic device 100 may allow the remaining microphones to maintain inactive states, and may change the inactive states of the remaining microphones into active states, based on a result of analyzing audio data that the at least one microphone collects.

The electronic device 102 may output audio data using a speaker and the like. Audio data output from the electronic device 102 may be provided as an input of at least one of the plurality of microphones of the electronic device 100. According to various embodiments of the present disclosure, the electronic device 102 may receive a result according to the function process of the electronic device 100 or may perform a function in conjunction with the electronic device 100. For example, in the case where the electronic device 100 performs a function according to an analysis of specific audio data, the electronic device 102 may form a communication channel with the electronic device 100.

The electronic device 104 may form a communication channel with the electronic device 100 through the network 162. The electronic device 104 may receive a result of the function process according to an analysis of audio data of the electronic device 100. For example, in the case where the electronic device 100 performs a call function according to the analysis of audio data, the electronic device 104 may form a communication channel in response to a request of the electronic device 100.

The server device 106 may form a communication channel with the electronic device 100 through the network 162. The server device 106 may provide information associated with voice recognition to the electronic device 100. According to various embodiments of the present disclosure, the server device 106 may provide service information associated with a specific function performed at the electronic device 100 in response to a result of analyzing audio data. For example, the server device 106 may provide the electronic device 100 with a service page or content (e.g., an audio file, an image file, a text file, and the like) associated with the function process of the electronic device 100.

The network 162 may form a communication channel between the electronic devices 100 and 104 or between the electronic device 100 and the server device 106. The network 162 may transmit a variety of information associated with a function process of the electronic device 100.

Referring to FIG. 1, the electronic device 100 may include a communication interface 110, an input/output interface 120, an audio codec 130, a display 140, a memory 150, a processor 160, a low-power processing module 170, an audio data processing module 180, and a bus 190.

The electronic device 100 may include a microphone module MIC having at least one microphone (Mic1 to MicN). The microphone module MIC may operate in response to a control of the audio data processing module 180. According to an embodiment of the present disclosure, in the case where a detail recognition function of a voice recognition function is requested, the electronic device 100 may activate the plurality of microphones Mic1 to MicN to perform a voice recognition function associated with the detail recognition function. According to an embodiment of the present disclosure, in the case where a power saving function of the voice recognition function is requested, the electronic device 100 may activate one microphone, and when specific audio data is collected, the electronic device 100 may perform the voice recognition function to which the power saving function is applied, based on the plurality of microphones Mic1 to MicN.

The communication interface 110 may convey communications between the electronic device 100 and an external device (e.g., the electronic device 104 or the server device 106). For example, the communication interface 110 may be coupled with the network 162 through wireless communication or wired communication to communicate with the external device. The wireless communication may include, for example, at least one of Wi-Fi, Bluetooth (BT), near field communication (NFC), GPS, or cellular communication (e.g., long term evolution (LTE), LTE-advanced (LTE-A), code division multiple access (CDMA), wide code division multiple access (WCDMA), universal mobile telecommunications service (UMTS), wireless broadband (WiBro) or global system for mobile communications (GSM)). The wired communication may include, for example, at least one of a universal serial bus (USB), a high definition multimedia interface (HDMI), recommended standard 232 (RS-232), or a plain old telephone service (POTS).

According to an embodiment of the present disclosure, the network 162 may be a telecommunications network. The telecommunications network may include at least one of a computer network, an internet, an internet of things, or a telephone network. According to an embodiment of the present disclosure, a protocol (e.g., a transport layer protocol, a data link layer protocol or a physical layer protocol) for communications between the electronic device 100 and an external device may be supported by at least one of an application 154, an application programming interface 153, a middleware 152, a kernel 151, or the communication interface 110.

The communication interface 110 may include at least one communication unit associated with a call function of the electronic device 100. For example, the communication interface 110 may include a variety of communication units such as a mobile communication unit, a broadcasting receiving unit such as a digital multimedia broadcasting (DMB) module or a digital video broadcasting-handheld (DVB-H) module, a near field communication unit such as a ZigBee module as a BT module or a NFC module, a Wi-Fi communication module, and the like. According to an embodiment of the present disclosure, the communication interface 110 may form a communication channel associated with a voice call function, a video call function, and the like. The electronic device 100 may activate the voice recognition function while performing a call function of the communication interface 110.

According to various embodiments of the present disclosure, the communication interface 110 may receive streaming data including audio data, based on the Wi-Fi communication unit. The audio data processing module 180 may support a voice recognition function of streaming data received at a state where a communication channel is formed based on the Wi-Fi communication unit. According to an embodiment of the present disclosure, the audio data processing module 180 may control functions, such as changing the Wi-Fi communication channel of the communication 100, releasing the Wi-Fi communication channel of the communication 100, and the like, according to voice recognition. For example, if audio data such as "Hi Samsung, Stop streaming" is collected, the audio data processing module 180 may recognize "Hi Samsung" as specific audio data and "Stop streaming" as a function execution instruction. Accordingly, the communication interface 110 may stop a streaming data receiving function or may release a relevant communication channel.

According to various embodiments of the present disclosure, the communication interface 110 may form a communication channel with a voice recognition server device. For example, the communication interface 110 may transmit audio data, which is received after collecting specific audio data, to a specific voice recognition server device according to a control of the audio data processing module 180. The communication interface 110 may receive a voice recognition result from the specific voice recognition server device and may transfer the received voice recognition result to the audio data processing module 180.

The input/output interface 120 may send an instruction or data received from a user through an input/output device (e.g., a sensor, a keyboard, or a touch screen) to the processor 160, the memory 150, the communication interface 110, or the audio data processing module 180, for example, through the bus 190. For example, the input/output interface 120 may provide the processor 160 with data associated with a user touch input through a touch screen. Furthermore, the input/output interface 120 may output an instruction or data, which is received from the processor 160, the memory 150, the communication interface 110, or the audio data processing module 180, for example, through the bus 190, through the input/output device (e.g., a speaker or a display). For example, the input/output interface 120 may output voice data processed through the processor 160 to a user through a speaker.

The input/output interface 120 may generate an input signal of the electronic device 100. The input/output interface 120 may include, for example, at least one of a key pad, a dome switch, a touch pad (capacitive/resistive), a jog wheel, or a jog switch. The input/output interface 120 may be implemented in the form of button at the outside of the electronic device 100, and some buttons may be implemented with virtual key buttons. According to an embodiment of the present disclosure, the input/output interface 120 may include a plurality of keys used to receive number or character information and to set a variety of functions. Such keys may include a menu call key, a screen on/off key, a power on/off key, a volume adjustment key, a home key, and the like.

According to an embodiment of the present disclosure, the input/output interface 120 may generate an input event associated with activation of a voice recognition function, an input event associated with selection of a power saving function or a detail recognition function of the voice recognition function, an input event associated with releasing (or inactivation) of the voice recognition function, and the like. The input/output interface 120 may further generate an input event associated with a control of a function executed according to the voice recognition function, an event associated with an end of the executed function, and the like. The input event thus generated may be provided to the audio data processing module 180 so as to be applied to an instruction or an instruction set associated with a control of a relevant function.

The audio codec 130 may process an audio signal of the electronic device 100. For example, the audio codec 130 may send an audio signal received from the audio data processing module 180 to a speaker SPK. The audio codec 130 may process an audio signal (e.g., voice and the like) received from at least one microphone and may send the processing result to the audio data processing module 180. The audio codec 130 may convert an audio signal, such as voice and the like received from a microphone into a digital signal and may transfer the digital signal to the audio data processing module 180. The audio codec 130 can be implemented with a chip independent of the audio data processing module 180.

According to an embodiment of the present disclosure, when the voice recognition function is activated, the audio codec 130 may activate a first microphone Mic1 to monitor collecting of specific audio data. If the specific audio data is collected, the audio codec 130 may control to activate the microphones Mic2 to MicN and may perform the detail recognition function. The audio codec 130 may transfer a result processed according to the detail recognition function to the audio data processing module 180.

According to an embodiment of the present disclosure, when the voice recognition function is activated, the audio codec 130 may activate the plurality of microphones Mic1 to MicN included in the microphone module MIC to control collecting of audio data. In this operation, if specific audio data is collected using the plurality of microphones Mic1 to MicN, the audio codec 130 may perform at least a portion of a multi-microphone control process, based on the collected audio data. The multi-microphone control process may include at least one of a direction of arrival determining function, a beamforming function, or a noise suppression function. The audio codec 130 may transfer a result according to the multi-microphone control process to the audio data processing module 180. Alternatively, the audio codec 130 may perform the voice recognition function, based on a result according to the multi-microphone control process.

The display 140 may output a variety of screens corresponding to functions processed at the electronic device 100. For example, the display 140 may output a waiting screen, a menu screen, a lock screen, and the like. According to an embodiment of the present disclosure, the display 140 may output an icon or menu item associated with activation of the voice recognition function. The display 140 may output a screen associated with a setting change of the voice recognition function. The display 140 may output information associated with a voice preprocessing function being executed, such as information associated with either a power saving function state or a detail recognition function state. The display 140 may output text information of audio data recognized in executing the voice recognition function, information found with respect to the text information, or an executed function screen. In the case where an error is generated in recognizing audio data, the display 140 may output information of generation of an error. For example, in the case where voice is not accurately recognized, the display 140 may output an error message corresponding thereto.

According to an embodiment of the present disclosure, when the voice recognition function is activated, the display 140 may output information to one side of the display 140 indicating a position of at least one microphone in the microphone module MIC. For example, the display 140 may output information indicating a position of a first microphone Mic1 in performing the voice recognition function that is based on the first microphone Mic1. The display 140 may output information indicating positions of the plurality of microphones Mic1 to MicN in performing the voice recognition function that is based on the plurality of microphones Mic1 to MicN.

The display 140 may display a screen in a landscape mode, in a portrait mode, and a screen change according to a change between the landscape mode and the portrait mode, based on screen/device orientation of the electronic device 100. The display 140 may output information indicating a position of at least one microphone according to each mode in executing the voice recognition function at a state where a mode of the electronic device 100 is changed into the landscape mode or the portrait mode. Alternatively, the display 140 may output guide information for guiding so as to arrange in a landscape mode state or a portrait mode state in executing the voice recognition function. Outputting of the position information and guide information of the microphone module MIC can be omitted according to user setting and the like.

The display 140 may include at least one of a liquid crystal display (LCD), a thin film transistor-LCD (TFT-LCD), a light emitting diode (LED), an organic LED (OLED), an active matrix OLED (AMOLED), a flexible display, a bended display, and a 3D display. Some of the displays may be implemented with a transparent display of a transparent type or a photo transparent type so as to view its outside.

Furthermore, the display 140 may be provided as a touch screen and may be used as an input device as well as an output device. The display 140 may be implemented to convert a variation in pressure forced to a specific portion of the display 140, a variation in capacitance occurring at the specific portion of the display 140, or the like, into an electrical input signal. The display 140 may be configured to detect (or sense) touch pressure as well as touched position and area.

The display 140 may be configured to include a touch panel and a display panel. The touch panel may be placed on the display unit. The touch panel may be implemented in an add-on type where the touch panel is placed on the display panel or an on-cell type or an in-cell type where it is inserted in the display panel. The touch panel may provide the audio data processing module 180 with a user input responding to a user gesture of the display 140. A user input generated by a touch means such as a finger, a touch pen, or the like may include touch, multi-touch, tap, double tap, long tap, tap and touch, drag, flick, press, pinch in, pinch output, and the like.

The above-described user input may be defined with regard to the voice recognition function. For example, the user input may be defined by an input event for changing the power saving function or the detail recognition function. Furthermore, the user input may be defined by an input event for determining whether to use at least one selected from the plurality of microphones Mic1 to MicN included in the microphone module MIC, as a default microphone. The default microphone may be a microphone that is activated above all (or always or periodically) to collect specific audio data.

The memory 150 may store instructions or data received from the processor 160 or other components (e.g., the communication interface 110, the input/output interface 120, the display 140, the audio data processing module 180, and the like) or generated by the processor 160 or the other components. The memory 150 may include, for example, programming modules such as a kernel 151, a middleware 152, an application processing interface (API) 153, and an application 154. Each of the above-described programming modules may be implemented in the form of software, firmware, hardware, or a combination of at least two thereof.

The kernel 151 may control or manage system resources (e.g., the memory 150, the processor 160, the bus 190, and the like) that are used to execute operations or functions of remaining other programming modules, for example, the middleware 152, the API 153, or the application 154. Furthermore, the kernel 151 may provide an interface that accesses discrete components of the electronic device 100 on the middleware 152, the API 153, or the application 154 to control or manage them.

The middleware 152 may perform a mediation role so that the API 153 or the application 154 communicates with the kernel 151 to exchange data. Furthermore, with regard to task requests received from the application 154, for example, the middleware 152 may control (e.g., scheduling or load balancing) a task request using a method of assigning the priority, which enables the use of a system resource (e.g., the memory 150, the processor 160, the bus 190, or the like) of the electronic device 100, to at least one of the application 154.

The API 153 may be an interface through which the application 154 controls a function provided by the kernel 151 or the middleware 152, and may include, for example, at least one interface or function (e.g., an instruction) for a file control, a window control, image processing, a character control, or the like.

According to various embodiments of the present disclosure, the application 154 may include a short messaging service/multimedia messaging service (SMS/MMS) application, an e-mail application, a calendar application, an alarm application, a health care application (e.g., an application for measuring an exercise amount, a blood sugar, or the like), an environment information application (e.g., an application for providing air pressure, humidity, temperature information, or the like) or the like. Additionally or generally, the application 154 may be an application associated with information exchange between the electronic device 100 and an external electronic device (e.g., an electronic device 104). The application associated with information exchange may include, for example, a notification relay application for transmitting specific information to an external electronic device or a device management application for managing an external electronic device.

The notification relay application may include a function for providing an external electronic device (e.g., an electronic device 104) with notification information generated from another application (e.g., a message application, an e-mail application, a health care application, an environment information application or the like) of the electronic device 100. Additionally or generally, the notification relay application may receive, for example, notification information from an external electronic device (e.g., an electronic device 104) and may provide the notification information to a user. Additionally or generally, the notification relay application may manage (e.g., install, delete, or update), for example, the function (e.g., turn on/turn off of an external electronic device itself, or a portion thereof, or control of brightness or resolution of a screen) of at least a portion of the external electronic device (e.g., an electronic device 104) communicating with the electronic device 100, an application operating on the external electronic device, or a service (e.g., a communication, or telephone, service or a message service) provided by the external electronic device.

According to various embodiments, the application 154 may include an application that is designated according to an attribute (e.g., the kind of electronic device) of the external electronic device (e.g., an electronic device 104). For example, in the case where the external electronic device is an MP3 player, the application 154 may include an application associated with music reproduction. Similarly, in the case where the external electronic device is a mobile medical device, the application 154 may include an application associated with a health care. According to an embodiment of the present disclosure, the application 154 may include at least one of an application designated to the electronic device 100 or an application received from the external electronic device (e.g., an electronic device 104 or a server 106).

According to various embodiments of the present disclosure, the memory 150 may store a variety of programs and data associated with processing and controlling of data that relates to an operation of the electronic device 100. For example, the memory 150 may store an operating system and the like. According to an embodiment of the present disclosure, the memory 150 may store a program associated with the voice recognition function. The program associated with the voice recognition function may include at least one of an instruction set used to register specific audio data as specific audio data, an instruction set for comparing collected audio data and the specific audio data, or an instruction set for performing the voice recognition function according to the detail recognition function when the specific audio data is collected. The program associated with the voice recognition function may include an instruction set (or at least one functions) associated with selection of the power saving function or the detail recognition function and an instruction set for selecting a default microphone of the plurality of microphones Mic1 to MicN in the power saving function. The program associated with the voice recognition function may include an instruction set for applying at least one process of a multi-microphone process associated with the plurality of microphones Mic1 to MicN, an instruction set for recognizing audio data collected according to the multi-microphone process, and an instruction set for executing a specific function according to voice recognition.

According to an embodiment of the present disclosure, the memory 150 may store a first voice recognition model 51 and a second voice recognition model 53. The first voice recognition model 51 may be a voice recognition model associated with specific audio data. For example, the first voice recognition model 51 may include audio data (e.g., specific audio data or voice signal or a trained statistical model and error range information associated with a reference of the trained statistical model) corresponding to a wake-up command for activating the voice recognition function.

The first voice recognition model 51 may include utterance character information of utterance for a specific isolated character and speaker classification information associated with personal classification of the utterance for a specific isolated character. According to an embodiment of the present disclosure, the utterance character information of the first voice recognition model 51 may be provided to a device component which performs voice recognition of specific audio data in performing the voice recognition function that is based on the power saving function. According to an embodiment of the present disclosure, the speaker classification information of the first voice recognition model 51 may be provided to a device component which performs voice recognition of specific audio data in performing the voice recognition function that is based on the detail recognition function. Based on the above-described condition, the electronic device 100 may classify voices of specific persons and may execute a function according to a voice input from a relevant person. For example, if first audio data corresponding to "Hi Samsung" is collected, the electronic device 100 may determine whether the first audio data corresponds to voice signals of specific persons, using the first voice recognition model 51. If determined as being a voice signal of a specific person, the electronic device 100 may perform voice recognition of second audio data later received, for example, "Oh Duokgu call". The electronic device 100 may perform a multi-microphone process associated with second audio data corresponding to "Oh Duokgu call" collected using the plurality of microphones Mic1 to MicN. The electronic device 100 may control to perform voice recognition of third audio data, experiencing the multi-microphone process, to perform a call connection function.

According to various embodiments of the present disclosure, the first voice recognition model 51 may include a plurality of utterance character information and a plurality of classification information. Accordingly, a wake-up command of the voice recognition function may be defined by at least one. Furthermore, an authentication function of the wake-up command of the voice recognition function may be defined by classification information of a plurality of speakers. The audio data processing model 180 may provide a screen associated with an input or a change or adjustment of the wake-up command. The audio data processing model 180 may register a wake-up command, which is input on a wake-up command input screen, as specific audio data at the first voice recognition model 51. According to various embodiments of the present disclosure, the wake-up command may be defined only by speaker classification information without specified utterance character information. If specific audio data is collected, the audio data processing model 180 may determine whether the specific audio data corresponds to speaker classification information of an authenticated person and may control activation of the voice recognition function according to the determination result.

The second voice recognition model 53 may be a model that supports voice recognition of a variety of audio data of a speaker. For example, the second voice recognition model 53 may be a model that recognizes a voice in the form of letters or words, vocabularies, and morphemes pronounced in Korean. According to various embodiments of the present disclosure, the second voice recognition model 53 may be a model which recognizes a voice in the form of letters or words, vocabularies, and morphemes pronounced in at least one of English, Japanese, Spanish, French, German, Hindustani, and the like. If comparison of the specific audio data is completed through the first voice recognition model 51, the second voice recognition model 53 may be provided to a device component that performs the voice recognition function. The second voice recognition model 53 may be implemented to be different from the first voice recognition model 51 or may include the first voice recognition model 51.

According to various embodiments of the present disclosure, the first voice recognition model 51 or the second voice recognition model 53 may be stored (or disposed) at different storage areas. For example, the first voice recognition model 51 may be disposed at an audio codec (or a storage space which the audio codec can access), and the second voice recognition model 53 may be disposed at the audio data processing module 180 (or a storage space which the audio data processing module 180 can access). According to various embodiments of the present disclosure, the first voice recognition model 51 may be disposed at the low-power processing module 170 (or a storage space which the low-power processing module 170 can directly access).

According to various embodiments of the present disclosure, the memory 150 may include a buffer for temporarily storing audio data with regard to processing audio data that the microphone module MIC collects. The buffer may store audio data which a default microphone collects or audio data which the plurality of microphones Mic1 to MicN collects.

In this regard, at least one of the size of buffer or the number of buffers may be adjusted according to a control of the audio data processing module 180. The above-described buffer may be included in the memory 150. Alternatively, the buffer may be implemented to be independent of the memory 150.

The low-power processing module 170 may collect a signal associated with at least one sensor that the electronic device 100 includes. For example, the low-power processing module 170 may activate at least one microphone of the microphone module MIC and may collect audio data. Power consumption of the low-power processing module 170 may be less than those of the audio codec 130 and the audio data processing module 180, and the low-power processing module 170 may be designed to operate the microphone module MIC. For example, the low-power processing module 170 may include circuit modules associated with the voice recognition function and a signal line(s). According to an embodiment of the present disclosure, the low-power processing module 170 may be designed to perform at least one control process of activation of at least one microphone, collection of audio data, comparison between collected audio data and specific audio data, and a multi-microphone control process according to the comparison result.

The microphone module MIC may include the plurality of microphones Mic1 to MicN. For example, the microphone module MIC may include a first microphone Mic1 and a second microphone Mic2. Either the first microphone Mic1 or the second microphone Mic2 may be activated to perform the power saving function in executing the voice recognition function. Alternatively, the first microphone Mic1 and the second microphone Mic2 may be activated to perform the detail recognition function in executing the voice recognition function. At least one piece of audio data that the first microphone Mic1 and the second microphone Mic2 collect may be supplied to at least one of the audio codec 130, the low-power processing module 170, or the audio data processing module 180. Audio data that at least one of the microphones Mic1 to MicN collects may be temporarily stored at the buffer of the memory 150.

The processor 160 may receive instructions from the above-described other components (e.g., the communication interface 110, the input/output interface 120, the display 140, the memory 150, the audio data processing module 180, and the like) through the bus 190, may decode the received instructions, and may perform data processing or operations according to the decoded instructions.

The audio data processing module 180 may process and transfer data associated with an operation of the electronic device 100 and may process and transfer a control signal. According to an embodiment of the present disclosure, the audio data processing module 180 may support at least one of an activation control of the microphone module MIC associated with execution of the voice recognition function, a wake-up command process, a multi-microphone control process, a voice recognition function process, and an additional function execution process according to voice recognition. According to an embodiment of the present disclosure, the audio data processing module 180 may include a first signal processing module, a second signal processing module, a multi-channel signal processing module, a DOA decision unit, or a beamforming/noise cancelling module. The first signal processing module may include at least one of a single channel signal processing module or a first voice recognition module. The second signal processing module may include a multi-channel signal processing module or a second voice recognition module. Each module of the above-described audio data processing module 180 may be implemented using at least one processor 160. At least a portion of the audio data processing module 180 with the above-described configuration may be disposed in at least one of the audio codec 130 or the low-power processing module 170.

According to various embodiments of the present disclosure, if audio data, corresponding to execution of a specific function, from among collected audio data, is collected, the audio data processing module 180 may control to perform a relevant function. According to an embodiment of the present disclosure, the audio data processing module 180 may execute voice recognition of the collected audio data. The audio data processing module 180 may control to perform a specific function corresponding to voice-recognized audio data.

According to various embodiments of the present disclosure, the communication interface 110 may receive broadcasting data, based on a broadcasting receiving unit. When outputting the received broadcasting data, the audio data processing module 180 may support the voice recognition function with respect to audio data included in the broadcasting data. The audio data processing module 180 may control activation of the voice recognition function and execution of a function according to voice recognition, if there is collected a specific activation command (e.g., a command associated with activation of the voice recognition function and a command (wakeup command) for waking up the voice recognition function) and audio data corresponding to voice recognition are collected. For example, the audio data processing module 180 may control a channel change of the broadcasting receiving unit, based on voice recognition. The activation command may correspond to specific audio data, for example, specific audio data set to the electronic device 100 or specific voice data set by a user.

According to various embodiments of the present disclosure, specific audio data corresponding to the activation command may be, for example, "Hi Samsung". As audio data collected next to the specific audio data, the function execution command may be, for example, "Channel Change 11", "Channel 5", and the like. Based on the audio data collected next to the specific audio data, the communication interface 110 may change a channel to channel 11 or may change the channel to channel 5.

According to various embodiments of the present disclosure, the audio data processing module 180 may receive a result of the multi-microphone control process from the audio codec 130. The audio data processing module 180 may perform the voice recognition function, based on the second voice recognition model 53.

According to various embodiments of the present disclosure, the audio data processing module 180 may receive the wakeup command from the low-power processing module 170. The audio data processing module 180 may perform the multi-microphone control process and the voice recognition function that is based on the second voice recognition model 53.

According to various embodiments of the present disclosure, the audio data processing module 180 may receive the wakeup command, which the low-power processing module 170 transfers, as well as a result of the multi-microphone control process which the audio codec 130 transfers. The audio data processing module 180 may perform the voice recognition function that is based on the second voice recognition model 53.

According to various embodiments of the present disclosure, the audio data processing module 180 may receive a value (hereinafter referred to as "DOA decision value") for deciding a direction of arrival, from the low-power processing module 170. The audio data processing module 180 may perform the multi-microphone control process in response to the DOA decision value and may process the voice recognition function that is based on the second voice recognition model 53.

According to various embodiments of the present disclosure, the audio data processing module 180 may process a wakeup command search function, which is based on the first voice recognition model 51 of the low-power processing module 170, and a voice recognition function which is based on the audio codec 130.

According to various embodiments of the present disclosure, the electronic device 100 may include a first processor which collects specific audio data with regard to a voice recognition function and generates a wakeup command, a multi-microphone processing module which performs a multi-microphone process associated with the collected audio data in response to the wakeup command, and a second processor which executes voice recognition with respect to audio data experiencing the multi-microphone process. The first processor, the multi-microphone processing module, and the second processor may be disposed in one of the audio codec 130, the low-power processing module 170, and the audio data processing module 180.

According to various embodiments of the present disclosure, the electronic device 100 may include a first processor which collects specific audio data with regard to a voice recognition function and generates a wakeup command, a DOA decision unit, which determines directions of arrival associated with a plurality of microphones Mic1 to MicN in response to the wakeup command, a beamforming/noise canceling module, which applies beamforming or noise canceling according to the directions of arrival determined thus, and a second processor which executes voice recognition with respect to beam-formed or noise-canceled audio data. The first processor, the DOA decision unit, the beamforming/noise canceling module, and the second processor may be disposed in one of the audio codec 130, the low-power processing module 170, and the audio data processing module 180. A module according to various embodiments of the present disclosure may be hardware, firmware, software, or a combination of at least two thereof.

Hereinafter, arrangement of the above-described processors and device components is more fully described below with reference to accompanying drawings.

Figure 2:
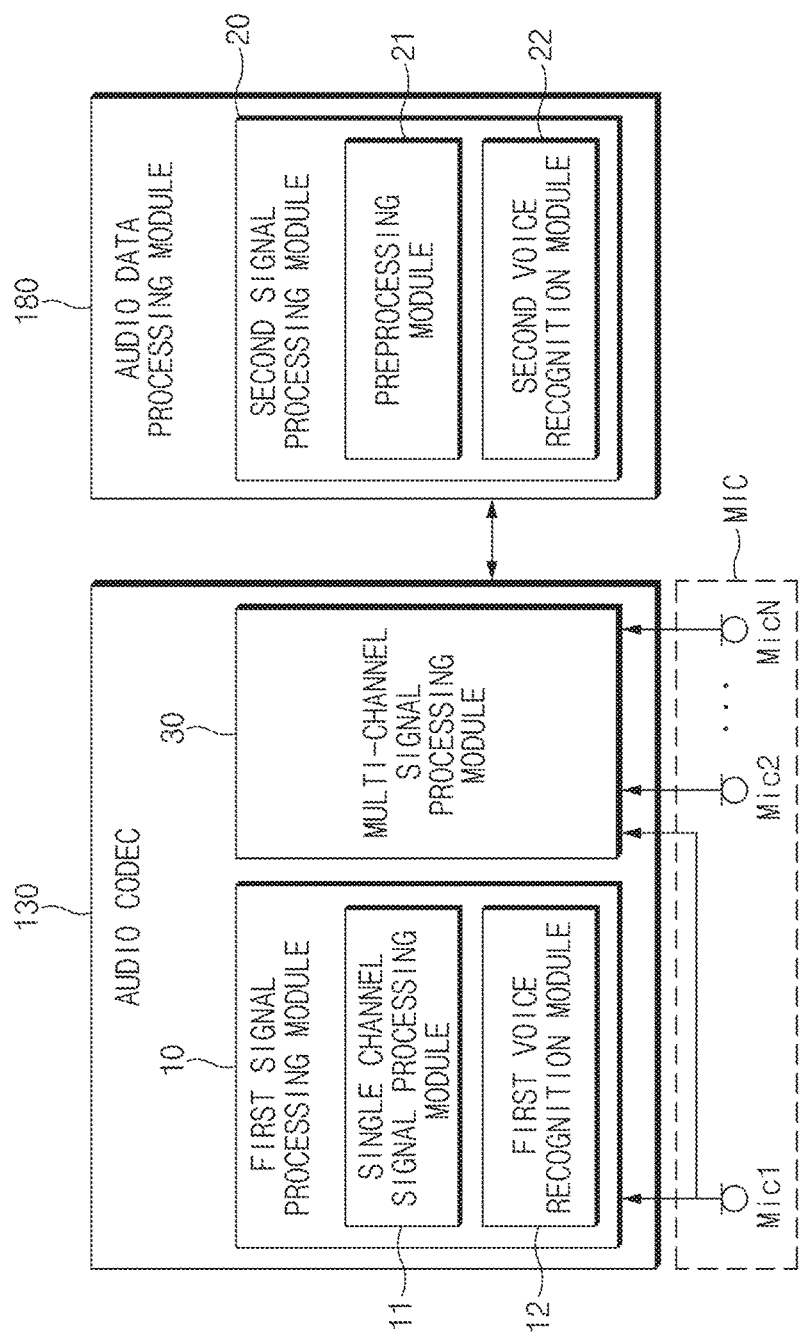
FIG. 2 illustrates an electronic device which operates microphones, based on an audio codec and an audio data processing module, according to an embodiment of the present disclosure.

FIG. 2 illustrates an electronic device which uses microphones, based on an audio codec and an audio data processing module, according to an embodiment of the present disclosure.

Referring to FIG. 2, an electronic device 100 associated with using of a plurality of microphones according to an embodiment of the present disclosure may contain the audio codec 130 which includes a first signal processing module 10 (including a single channel signal processing module 11 and a first voice recognition module 12) and a multi-channel signal processing module 30, the audio data processing module 180 which includes a second signal processing module 20 (including a pre-processing module 21 and a second voice recognition module 22), and a plurality of microphones Mic1 to MicN.

The audio codec 130 may include the first signal processing module 10 and the multi-channel signal processing module 30. The first signal processing module 10 of the first audio codec 130 may control to activate a first microphone Mic1 corresponding to a default microphone according to setting. For example, if a power saving function is set at a state in which activation of a voice recognition function is requested, the first signal processing module 10 may control to activate the first microphone Mic1. The first signal processing module 10 may operate a first voice recognition model 51 stored in the memory 150. The first signal processing module 10 may perform voice recognition of first audio data that the first microphone Mic1 collects. The first signal processing module 10 may determine whether the collected first audio data is specific audio data corresponding to the first voice recognition model 51. When the collected first audio data is the specific audio data, the first signal processing module 10 may transfer a wakeup command, set to activate the multi-channel signal processing module 30, to the multi-channel signal processing module 30.

The first signal processing module 10 may include the single channel signal processing module 11 and the first voice recognition module 12, and additionally or generally, may include the first voice recognition model 51. The single channel signal processing module 11 may correct the first audio data which the first microphone Mic1 collects. For example, the single channel signal processing module 11 may perform at least a portion of functions capable of processing an audio signal, such as adaptive echo canceler (AEC), noise suppression (NS), end-point detection (EPD), automatic gain control (AGC), and the like. As regards supporting a low-power operation, the first signal processing module 10 may omit the whole pre-processing function, or may control to perform a portion of the pre-processing function. The first signal processing module 10 may be driven using power different from that of the second signal processing module 20, for example, power less than that associated with an operation of the second signal processing module 20. In the case where designed such that a portion of the preprocessing function is applied, the single channel signal processing module 11 may preprocess audio data collected according to a relevant design. The single channel signal processing module 11 may transfer the preprocessed audio data to the first voice recognition module 12. In the case where the preprocessing function is omitted with regard to low-power driving, a configuration, associated with the preprocessing function, of the single channel signal processing module 11 may be omitted. In this case, the collected audio data may be directly processed by the first voice recognition module 12.

The first voice recognition module 12 may analyze whether audio data collected through loading and operating of the first voice recognition model 51 is specific audio data (or whether similarity between the collected audio data and a trained statistical model is within a specific error range). The first voice recognition model 51 may be stored at a memory 150 and may be referred by the first voice recognition model 12 or may be mounted at the first signal processing module 10. The first voice recognition model 12 may generate a wakeup command (or activation command) when the specific audio data is collected. The first voice recognition model 12 may transfer the wakeup command to the multi-channel signal processing module 30.

If receiving the wakeup command from the first signal processing module 10, the multi-channel signal processing module 30 included in the audio codec 130 may control to activate a plurality of microphones Mic1 to MicN included in a microphone module MIC. The multi-channel signal processing module 30 may apply a multi-microphone processing function to second audio data collected by the microphones Mic1 to MicN to generate third audio data experiencing multi-microphone processing. For example, the multi-channel signal processing module 30 may include a DOA detection unit, a beamforming unit, a noise reduction unit, an error cancellation unit, and the like. The multi-channel signal processing module 30 may provide directivity of a voice obtaining direction of second audio data collected to generate third audio data of which the SINR (signal to interference noise ratio) is enhanced. The DOA detection unit may detect a direction of arrival associated with the second audio data collected. A function of detecting the direction of arrival may be a function of detecting a direction of a selected voice. The beamforming unit may perform beamforming in which a sound of a specific direction is obtained by applying a filter corresponding to a parameter, which is calculated using a voice direction value detected according to the direction-of-arrival function, to second audio data received from the plurality of microphones Mic1 to MicN. The noise reduction unit may perform noise suppression (NS) by suppressing obtaining of a sound of a specific direction. The echo cancellation unit may perform echo cancelling of the second audio data collected. The multi-channel signal processing module 30 may apply at least one of the above-described multi-microphone processing functions to the second audio data to generate the third audio data.

The third audio data processed by the multi-channel signal processing module 30 may be provided to the second signal processing module 20 of the audio data processing module 180. At this time, the second audio data which the multi-channel signal processing module 30 collects may have a more accurate voice signal characteristic according to the multi-microphone processing function.

The second signal processing module 20 of the audio data processing module 180 may receive the third audio data, to which the multi-microphone processing function is applied, from the multi-channel signal processing module 30. The second signal processing module 20 may perform a voice recognition function of the third audio data. The second signal processing module 20 may use a second voice recognition model 53 stored at the memory 150.

The second signal processing module 20 may perform a specific function in response to a voice recognition result of the third audio data. For example, the second signal processing module 20 may control to perform a search function in which the voice recognition result is used as a search word. According to an embodiment of the present disclosure, the second signal processing module 20 may search for and output data, associated with a search word corresponding to the voice recognition result, from the memory 150. According to an embodiment of the present disclosure, the second signal processing module 20 may transmit the voice recognition result to a specific server device and may receive and output information corresponding to the voice recognition result from the specific server device. According to various embodiments of the present disclosure, the second signal processing module 20 may control to activate a specific function corresponding to the voice recognition result.

The second signal processing module 20 may include the preprocessing module 21 and the second voice recognition module 22, and additionally or generally, may include the second voice recognition model 53. The preprocessing module 21 may employ at least one of various functions capable of processing audio signals, such as adaptive echo canceler (AEC), noise suppression (NS), end-point detection (EPD), automatic gain control (AGC), and the like. For example, if an output signal is generated while an application (a call application, a ring tone application, a music player application, a camera application, and the like) capable of generating an output signal during a voice input is running, the preprocessing module 21 may apply the AEC function for echo processing to the output signal. Audio data preprocessed by the preprocessing module 21, for example, audio data obtained by preprocessing the third audio data from the multi-channel signal processing module 30 may be transferred to the second voice recognition module 22.

The second voice recognition module 22 may transfer a voice recognition result of audio data voice-recognized (or additionally preprocessed) based on the second voice recognition model 53, to the audio data processing module 180. Alternatively, the second voice recognition module 22 may transfer the voice recognition result to a device component where the second signal processing module 20 is disposed. The device component which receives the voice recognition result may control to execute a specific function in which the voice recognition result is used as a function execution command.

According to various embodiments of the present disclosure, the second signal processing module 20 may perform the voice recognition function using the server device 106. For example, when receiving the third audio data, the second voice recognition module 22 of the second signal processing module 20 may control to activate a communication interface 110 to form a communication channel with a server device supporting the voice recognition function. The second signal processing module 20 may transfer the collected third audio data to the server device 106 and may receive a voice recognition result from the server device 106. The second signal processing module 20 may perform a preprocessing operation of the third audio data. In this case, the third audio data transmitted to a server device may be third audio data preprocessed.

A first microphone Mic1 of the plurality of microphones Mic1 to MicN may be activated according to a control of the first signal processing module 10. The first microphone Mic1 may provide the first signal processing module 10 with first audio data collected. In the case where the first audio data collected by the first microphone Mic1 is specific audio data, the microphones Mic2 to MicN may be activated according to a control of the multi-channel signal processing module 30. Alternatively, the plurality of microphones Mic1 to MicN may be activated according to a control of the first signal processing module 10. The first audio data collected by the first microphone Mic1 may be also provided to the multi-channel signal processing module 30. Accordingly, the first microphone Mic1 may include a signal line for supplying audio data to the first signal processing module 10 and a signal line for supplying audio data to the multi-channel signal processing module 30. The first microphone Mic1 may change a provider of audio data according to a control of the first signal processing module 10 or the multi-channel signal processing module 30. Second to N-th microphones Mic2 to MicN of the microphone module MIC may be configured to supply the second audio data collected to the multi-channel signal processing module 30. Accordingly, the first microphone Mic1 used as a default microphone may be controlled by the first signal processing module 10, and the second to N-th microphones Mic2 to MicN may be controlled by the multi-channel signal processing module 30.

As described above, the electronic device 100 according to various embodiments of the present disclosure may detect a wakeup command using the first microphone Mic1, and when the wakeup command is detected, the electronic device 100 may activate the microphones Mic2 to MicN to collect audio data to which the multi-microphone processing function is applied. Accordingly, the electronic device 100 according to various embodiments of the present disclosure may collect and apply accurate audio data in an actual voice recognition section while saving power using a default microphone.

Figure 3:
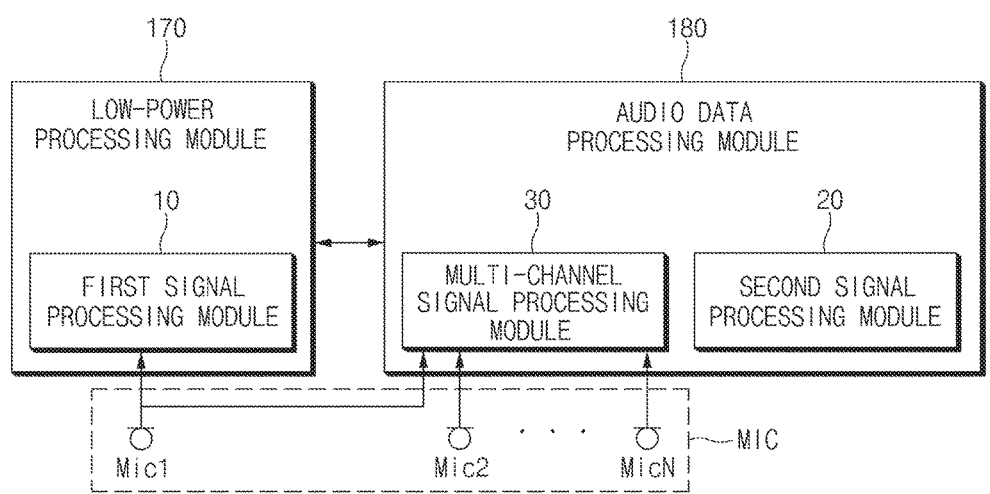
FIG. 3 illustrates an electronic device which uses microphones based on a low-power processing module and an audio data processing module, according to an embodiment of the present disclosure.

FIG. 3 illustrates an electronic device which uses microphones based on a low-power processing module and an audio data processing module, according to various embodiments of the present disclosure.

Referring to FIG. 3, an electronic device 100 associated with an operation of microphones, according to an embodiment of the present disclosure may contain a low-power processing module 170 including a first signal processing module 10, the audio data processing module 180 including the multi-channel signal processing module 30 and the second signal processing module 20, and a plurality of microphones Mic1 to MicN.

The low-power processing module 170 may control activation of a first microphone Mic1 and collection of first audio data, based on the first signal processing module 10. The low-power processing module 170 may use the first microphone Mic1 if execution of a voice recognition function is requested or the first microphone Mic1 is set as a default microphone, and may perform activation of the first microphone Mic1 and collection of the first audio data. According to an embodiment of the present disclosure, with regard to voice recognition of first audio data collected through the first microphone Mic1, the low-power processing module 170 may use the first microphone Mic1 according to a control of the audio data processing module 180.

As regards voice recognition of the first audio data collected through the first microphone Mic1 activated, the first signal processing module 10 of the low-power processing module 170 may load or activate a first voice recognition model 51 stored in the memory 150. The first signal processing module 10, as described with reference to FIG. 1, may determine whether the first audio data is the same or similar to specific audio data. The first signal processing module 10 may determine whether the first audio data is the specific audio data corresponding to the first voice recognition model 51.

The first signal processing module 10 may transfer a wakeup command to the audio data processing module 180 according to a result of analyzing the first audio data. For example, the first signal processing module 10 may transfer the wakeup command to the multi-channel signal processing module 30 of the audio data processing module 180. As regards a voice recognition function, the first signal processing module 10 of the low-power processing module 170 may have a sleep state or a low-power operating state before transferring the wakeup command. For example, when the first signal processing module 10 of the low-power processing module 170 detects specific audio data, a display 140 may remain at a turn-off state in response to a control of the audio data processing module 180. If first audio data corresponding to specific audio data (or a specific error range between first audio data and a trained statistical model) is collected, the first signal processing module 10 may change a transmission path of audio data that the first microphone Mic1 collects. For example, the first signal processing module 10 may control to transfer audio data, which the first microphone Mic1 collects, to the multi-channel signal processing module 30 of the audio data processing module 180. Furthermore, the first signal processing module 10 may transfer authority for activating or inactivating the first microphone Mic1 to the audio data processing module 180.

If receiving the wakeup command from the low-power processing module 170, the audio data processing module 180 may transition from the sleep state to a wake state. The audio data processing module 180 may activate the multi-channel signal processing module 30 and the second signal processing module 20 with regard to supporting the voice recognition function.

The multi-channel signal processing module 30 of the audio data processing module 180 may control an operation of a microphone module MIC in response to the wakeup command from the low-power processing module 170. For example, second to N-th microphones Mic2 to MicN may be set to an active state according to a control of the multi-channel signal processing module 30, respectively. The multi-channel signal processing module 30 may determine a transmission path of audio data associated with the first microphone Mic1 and may receive audio data that the first microphone Mic1 collects. When receiving the wakeup command, the multi-channel signal processing module 30 may obtain authority for use (e.g., authority for activating or inactivating the first microphone Mic1) of the first microphone Mic1. The multi-channel signal processing module 30 may generate third audio data by applying a multi-microphone processing function to pieces of second audio data that microphones Mic1 to MicN included in the microphone module MIC collect. The multi-channel signal processing module 30 may transfer the third audio data thus generated to the second signal processing module 20.

In the case where a state of the audio data processing module 180 is changed according to an input of the wakeup command, the second signal processing module 20 may use a second voice recognition model 53 stored at the memory 150 (or mounted at a signal processing module). The second signal processing module 20 may perform voice recognition of the third audio data, which the multi-channel signal processing module 30 transfers, based on the second voice recognition model 53. The second signal processing module 20 may control to perform a specific function based on a voice-recognized result value. For example, as described above, the second signal processing module 20 may perform a search function according to a voice recognition result. The second signal processing module 20 may control to end an application associated with the voice recognition function upon receiving an end event of the application. The second signal processing module 20 may control to transfer the application end event to the multi-channel signal processing module 30 to inactivate a portion of the plurality of microphones Mic1 to MicN.

The first microphone Mic1 of the microphone module MIC may be coupled to the first signal processing module 10 of the low-power processing module 170. Furthermore, the first microphone Mic1 may be coupled to the multi-channel signal processing module 30 of the audio data processing module 180. When activated in response to a control of the first signal processing module 10 of the low-power processing module 170, the first microphone Mic1 may collect first audio data and may transfer the first audio data thus collected to the first signal processing module 10. Under a control of the multi-channel signal processing module 30, the first microphone Mic1 may collect second audio data together with other microphones and may provide the second audio data thus collected to the multi-channel signal processing module 30. Second to N-th microphones Mic2 to MicN of the microphone module MIC may be coupled to the multi-channel signal processing module 30. In response to a control of the multi-channel signal processing module 30, the second to N-th microphones Mic2 to MicN may collect pieces of second audio data and may transfer the pieces of the second audio data to the multi-channel signal processing module 30. The second to N-th microphones Mic2 to MicN may be inactivated in response to a control of the multi-channel signal processing module 30. The first microphone Mic1 may be also deactivated in response to a control of the multi-channel signal processing module 30. The first signal processing module 10 of the low-power processing module 170 may obtain authority for controlling the first microphone Mic1 set to an inactive state.

According to various embodiments of the present disclosure, the audio data processing module 180 may be implemented with an audio codec 130. Accordingly, the audio codec 130 may include the multi-channel signal processing module 30 and the second signal processing module 20. When receiving a wakeup command from the first signal processing module 10 of the low-power processing module 170, the audio codec 130 may use the microphone module MIC to collect pieces of second audio data. The multi-channel signal processing module 30 of the audio codec 130 may apply a multi-microphone processing function to the second audio data thus collected to generate third audio data and may transfer the third audio data to the second signal processing module 20. The second signal processing module 20 of the audio codec 130 may execute voice recognition of the third audio data and may transfer a voice recognition result to the audio data processing module 180. The audio data processing module 180 may perform a predetermined function, based on the voice recognition result which the audio codec 130 transfers.

Figure 4:
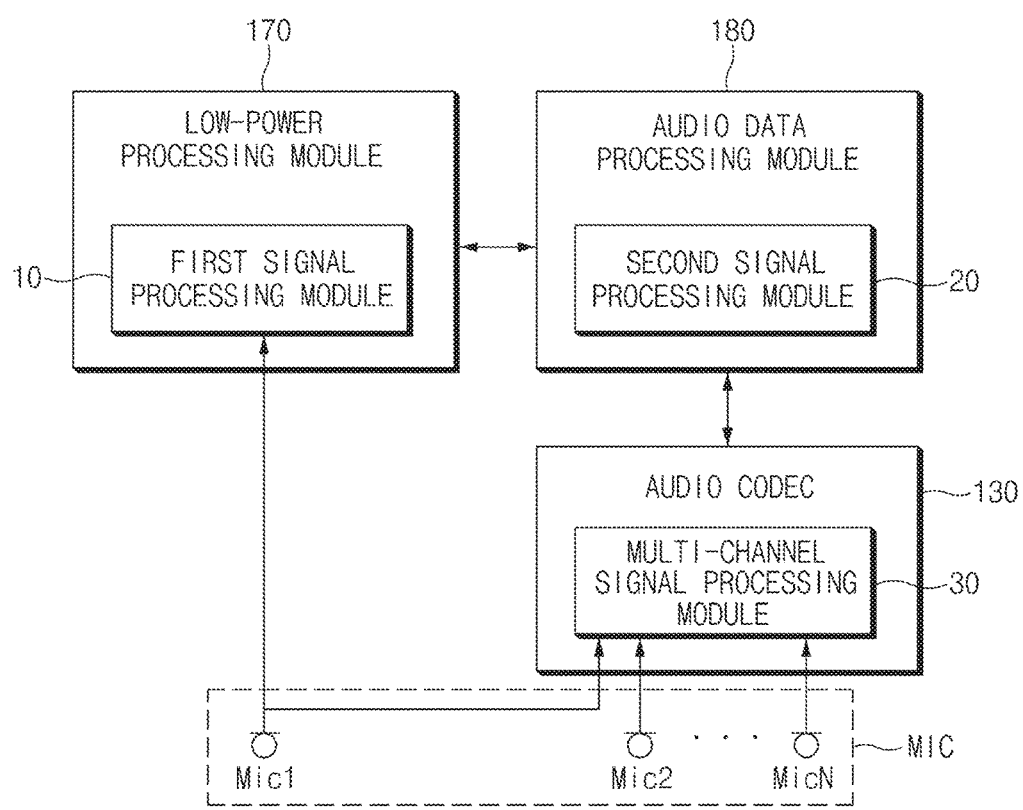
FIG. 4 illustrates an electronic device which uses microphones based on a low-power processing module, an audio data processing module, and an audio codec according to an embodiment of the present disclosure.

FIG. 4 illustrates an electronic device which uses microphones based on a low-power processing module, an audio data processing module, and an audio codec according to various embodiments of the present disclosure.

Referring to FIG. 4, an electronic device 100 relating to microphone management according to an embodiment of the present disclosure may include the audio codec 130 including the multi-channel signal processing module 30, the low-power processing module 170 including the first signal processing module 10, and the audio data processing module 180 including the second signal processing module 20, and a plurality of microphones Mic1 to MicN.

As regards execution of a voice recognition function, the low-power processing module 170 may use the first signal processing module 10. The first signal processing module 10 of the low-power processing module 170 may control to active a first microphone Mic1 if execution of a power saving function of a voice recognition function is set or requested. The first signal processing module 10 of the low-power processing module 170 may compare audio data, which the first microphone Mic1 collects, with a first voice recognition model 51 to detect specific audio data (or similarity between the audio data and a trained statistical model). When the specific audio data is detected, the first signal processing module 10 may transfer a wakeup command to the multi-channel signal processing module 30 of the audio codec 130. Furthermore, under a control of the first signal processing module 10 of the low-power processing module 170, a transmission path of audio data collected by the first microphone Mic1 may be changed so as to be transferred to the multi-channel signal processing module 30 of the audio codec 130. Under a control of the first signal processing module 10 of the low-power processing module 170, a wakeup command may be transferred to the audio data processing module 180 so as to activate the second signal processing module 20.

The audio codec 130 may activate the multi-channel signal processing module 30 in response to an input of the wakeup command from the first signal processing module 10 of the low-power processing module 170. The multi-channel signal processing module 30 of the audio codec 130 may activate second to N-th microphones Mic2 to MicN. The multi-channel signal processing module 30 of the audio codec 130 may collect second audio data using a microphone module MIC. The multi-channel signal processing module 30 of the audio codec 130 may generate third audio data by applying a multi-microphone processing function to the second audio data collected. The multi-channel signal processing module 30 of the audio codec 130 may transfer the third audio data to the second signal processing module 20 of the audio data processing module 180.

The second signal processing module 20 of the audio data processing module 180 may execute voice recognition of the third audio data which the audio codec 130 transfers. The second signal processing module 20 may preprocess the third audio data. The second signal processing module 20 may perform a voice recognition function of the preprocessed third audio data, based on a second voice recognition model 53. The second signal processing module 20 may control to execute a specific function in response to a voice recognition result.

The first microphone Mic1 of the microphone module MIC may be coupled to the first signal processing module 10 of the low-power processing module 170. Furthermore, the first microphone Mic1 may be coupled to the multi-channel signal processing module 30 of the audio codec 130. The first microphone Mic1 may be activated according to a control of the first signal processing module 10, and a transmission path may be changed after first audio data corresponding to specific audio data is collected. The first microphone Mic1 may provide the multi-channel signal processing module 30 of the audio codec 130 with audio data that is collected after the first audio data corresponding to the specific audio data is collected. Second to N-th microphones Mic2 to MicN may be coupled to the multi-channel signal processing module 30 of the audio codec 130 and may collect pieces of second data in response to a control of the multi-channel signal processing module 30.

As described above, the electronic device 100 according to various embodiments of the present disclosure may include the first microphone Mic1 which collects first audio data, the first signal processing module 10 which determines whether the first audio data includes specific audio data, the multi-channel signal processing module 30 which, when the specific audio data is detected, collects second audio data using a plurality of microphones and performs multi-microphone processing associated with the second audio data, and the second signal processing module 20 which executes voice recognition of the third audio data experiencing the multi-microphone processing.

According to various embodiments of the present disclosure, the first signal processing module 10 may include the first preprocessing unit which performs at least a portion of a plurality of preprocessing functions of the first audio data, the first voice recognition module 12 which executes voice recognition of the first audio data, and the first voice recognition model 51 which supports regulation voltage of the first audio data.

According to various embodiments of the present disclosure, the first voice recognition model 51 may include at least one of utterance character information and speaker classification information corresponding to the specific audio data.

According to various embodiments of the present disclosure, when the specific audio data is detected, the first signal processing module 10 may generate a wakeup command and may transfer the wakeup command to the multi-channel signal processing module 30.

According to various embodiments of the present disclosure, the multi-channel signal processing module 30 may activate the plurality of microphones Mic1 to MicN in response to an input of the wakeup command.

According to various embodiments of the present disclosure, the second signal processing module 20 may include the second preprocessing unit which performs a plurality of preprocessing functions of the third audio data, the second voice recognition module 22 which executes voice recognition of the third audio data, and the second voice recognition model 53 which supports voice recognition of the third audio data.

According to various embodiments of the present disclosure, the second signal processing module 20 may control execution of a specific function corresponding to the voice-recognized result.

According to various embodiments of the present disclosure, the multi-channel signal processing module 30 may include at least one of a DOA detection unit configured to detect directions of arrival associated with the second audio data, a beamforming processing unit configured to perform beamforming according to a detection of the directions of arrival, a noise suppression unit configured to suppress a noise by suppressing obtaining of a sound of a specific direction with respect to the pieces of the second audio data, and an echo cancellation unit configured to perform echo cancellation of the pieces of the second audio data.

According to various embodiments of the present disclosure, the electronic device 100 may include the audio codec 130 in which the first signal processing module 10 and the multi-channel signal processing module 30 are disposed and the audio data processing module 180 in which the second signal processing module 20 is disposed.

According to various embodiments of the present disclosure, the electronic device 100 may include the low-power processing module 170, including the first signal processing module 10, and the audio data processing module 180, including the multi-channel signal processing module 30 and the second signal processing module 20.

According to various embodiments of the present disclosure, the electronic device 100 may include the low-power processing module 170, including the first signal processing module 10, the audio codec 130, including the multi-channel signal processing module 30, and the audio data processing module 180, including the second signal processing module 20.

Figure 5:
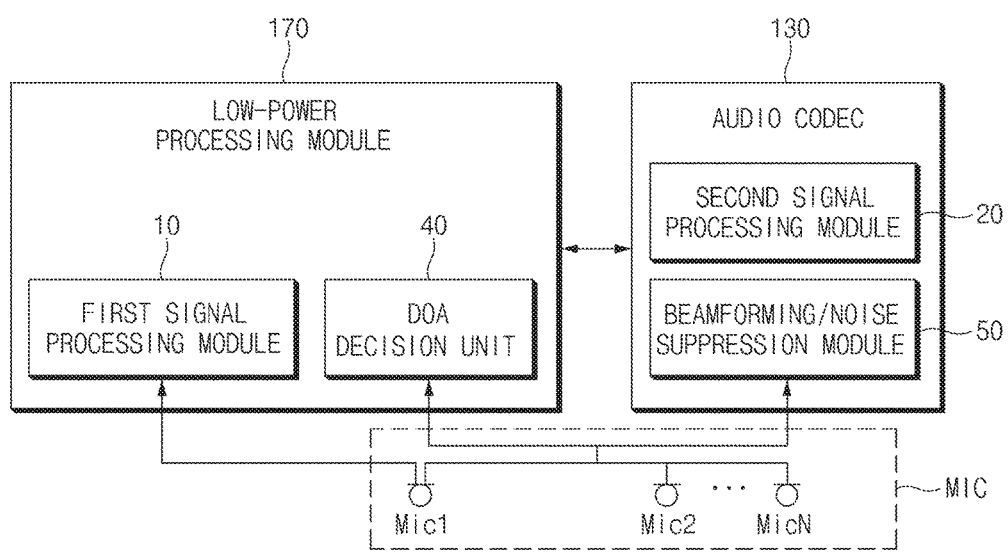
FIG. 5 illustrates an electronic device which supports microphone integrated employment based on a low-power processing module and an audio codec, according to an embodiment of the present disclosure.

FIG. 5 illustrates an electronic device which supports microphone integrated employment based on a low-power processing module and an audio codec, according to an embodiment of the present disclosure.

Referring to FIG. 5, the electronic device relating to microphone integrated employment may include the low-power processing module 170, which includes the first signal processing module 10 and the DOA decision unit 40, and the audio codec 130, which includes the beamforming/noise suppression module 50 and the second signal processing module 20.

As regards executing a voice recognition function, the low-power processing module 170 may employ the first signal processing module 10 and the DOA decision unit 40. The first signal processing module 10 of the low-power processing module 170 may control to activate a microphone module MIC when execution of a detail recognition function of a voice recognition function is set or requested. Alternatively, as regards executing the detail recognition function, by default, the first signal processing module 10 of the low-power processing module 170 may control to activate the microphone module MIC. The first signal processing module 10 of the low-power processing module 170 may compare first audio data, which a first microphone Mic1 collects, from among pieces of first audio data collected by the microphone module MIC with a first voice recognition model 51 to detect specific audio data. When the specific audio data is detected, the first signal processing module 10 of the low-power processing module 170 may transfer a wakeup command to the DOA decision unit 40.

The DOA decision unit 40 of the low-power processing module 170 may collect pieces of first audio data from the microphone module MIC that the first signal processing module 10 activates. In this operation, the DOA decision unit 40 of the low-power processing module 170 may temporarily store (buffer) the collected pieces of the first audio data. If receiving a wakeup command from the first signal processing module 10 of the low-power processing module 170, the DOA decision unit 40 of the low-power processing module 170 may determine a direction of arrival or generate information associated with a microphone array (MA), based on the first audio data. According to an embodiment of the present disclosure, the DOA decision unit 40 of the low-power processing module 170 may determine a sound obtaining direction based on the first audio data. The DOA decision unit 40 of the low-power processing module 170 may calculate a parameter associated with weighting a plurality of microphones Mic1 to MicN included in the microphone module MIC.

According to an embodiment of the present disclosure, the DOA decision unit 40 of the low-power processing module 170 may define weight parameters of a first microphone Mic1 and a second microphone Mic2 differently, based on a result of analyzing audio data collected by the microphone module MIC. The DOA decision unit 40 of the low-power processing module 170 may transfer the calculated weight parameters to the beamforming/noise suppression module 50 of the audio codec 130 performing beamforming/noise-suppression. The low-power processing module 170 may use audio data, which the first microphone Mic1 collects in real time, to determine specific audio data and to determine a direction of arrival based on buffering. According to various embodiments of the present disclosure, the low-power processing module 170 may use the first microphone Mic1 as being dedicated to determine the specific audio data. The low-power processing module 170 may use second to N-th microphones Mic2 to MicN to determine a direction of arrival. As regards the above condition, the low-power processing module 170 may set a plurality of microphones to a waiting state to determine a direction of arrival.

The beamforming/noise suppression module 50 of the audio codec 130 may process a weight parameter (a parameter associated with a beamforming direction or noise suppression) received from the DOA decision unit 40 of the low-power processing module 170. For example, the beamforming/noise suppression module 50 may apply different weights to a plurality of microphones Mic1 to MicN, based on a weight value of the weight parameter. The beamforming/noise suppression module 50 may apply different weights to audio data collected by the microphones Mic1 to MicN (i.e., different weights are applied to the microphones Mic1 to MicN, respectively), and may transfer the weighed audio data to the second signal processing module 20 of the audio codec 130. According to an embodiment of the present disclosure, the beamforming/noise suppression module 50 may set a weight of the first microphone Mic1 to, for example, 0.3, a weight of the second microphone Mic2 to, for example, 0.5, and a weight of the N-th microphone MicN to, for example, 0.2, based on the weight parameter. Weights thus set may be changed in real time or periodically according to the weight parameter that the DOA decision unit 40 provides.

The second signal processing module 20 of the audio codec 130 may receive beam-formed or noise-suppressed audio data from the beamforming/noise suppression module 50 of the audio codec 130 and may perform voice recognition of the beam-formed or noise-suppressed audio data. In this operation, the second signal processing module 20 of the audio codec 130 may preprocess the collected audio data and may perform voice recognition based on a second voice recognition model 53. The second signal processing module 20 of the audio codec 130 may transfer a voice recognition result to the audio data processing module 180. Alternatively, the audio codec 130 may control to perform a specific function according to a voice recognition result that the second signal processing module 20 outputs.

The first microphone Mic1 of the microphone module MIC may be coupled to the first signal processing module 10 of the low-power processing module 170, the DOA decision unit 40 of the low-power processing module 170, and the beamforming/noise suppression module 50 of the audio codec 130. The second to N-th microphones Mic2 to MicN may be coupled to the DOA decision unit 40 of the low-power processing module 170 and the beamforming/noise suppression module 50 of the audio codec 130. The microphone module MIC may be activated according to a control of the first signal processing module 10 of the audio codec 130, and a transmission path may be changed according to collection of first audio data corresponding to specific audio data. For example, the first microphone Mic1 may transfer the first audio data corresponding to specific audio data to the first signal processing module 10 of the low-power processing module 170 and the DOA decision unit 40 of the low-power processing module 170. The second to N-th microphones Mic2 to MicN may transfer the first audio data to the DOA decision unit 40 of the low-power processing module 170. Afterwards, the second audio data may be transferred to the beamforming/noise suppression module 50 of the audio codec 130, and the beamforming/noise suppression module 50 of the audio codec 130 may apply at least one of beamforming and noise suppression thereto so as to be converted into parameter-processed audio data. The parameter-processed audio data may be transferred to the second signal processing module 20 of the audio codec 130.

As performing a voice recognition function according to the above-described manner, the electronic device 100 may perform voice recognition and functions seamlessly. For example, audio data such as "Hi Samsung, Broadcasting Channel 5" may be collected by a plurality of microphones Mic1 to MicN. "Hi Samsung" collected by the first microphone Mic1 may be transferred to the first signal processing module 10 to determine whether it is specific audio data. In this operation, the second to N-th microphones Mic2 to MicN may buffer and store first audio data corresponding to "Hi Samsung". When receiving a wakeup command from the first signal processing module 10, the DOA decision unit 40 of the low-power processing module 170 may determine a weight parameter, based on the buffered "Hi Samsung". In the case where "Hi Samsung" is not the specific audio data, the DOA decision unit 40 of the low-power processing module 170 may replace it with another audio data received later. Another embodiment may be also possible. A weight parameter that the DOA decision unit 40 calculates may be transferred to the beamforming/noise suppression module 50.

The beamforming/noise suppression module 50 of the audio codec 130 may weight, for example, "Broadcasting Channel 5" and may transfer the weighted audio data to the second signal processing module 20. The second signal processing module 20 may perform preprocessing and voice recognition of the weighted audio data and may calculate a result of performing the preprocessing and voice recognition. Under a control of the audio data processing module 180 receiving a voice recognition result from the audio codec 130, a broadcasting receiving unit may be activated when "Broadcasting Channel 5" is recognized as a voice recognition result, thereby allowing a broadcasting channel to be tuned to broadcasting channel 5. According to various embodiments of the present disclosure, the beamforming/noise suppression module 50 may receive information of a section corresponding to the specific audio data recognized as "Hi Samsung", from the DOA decision unit 40. The beamforming/noise suppression module 50 may weight audio data collected afterwards, without processing the specific audio data. Accordingly, the beamforming/noise suppression module 50 may transfer, to the second signal processing module 20, audio data about "Broadcasting Channel 5" except "Hi Samsung".

Figure 6:
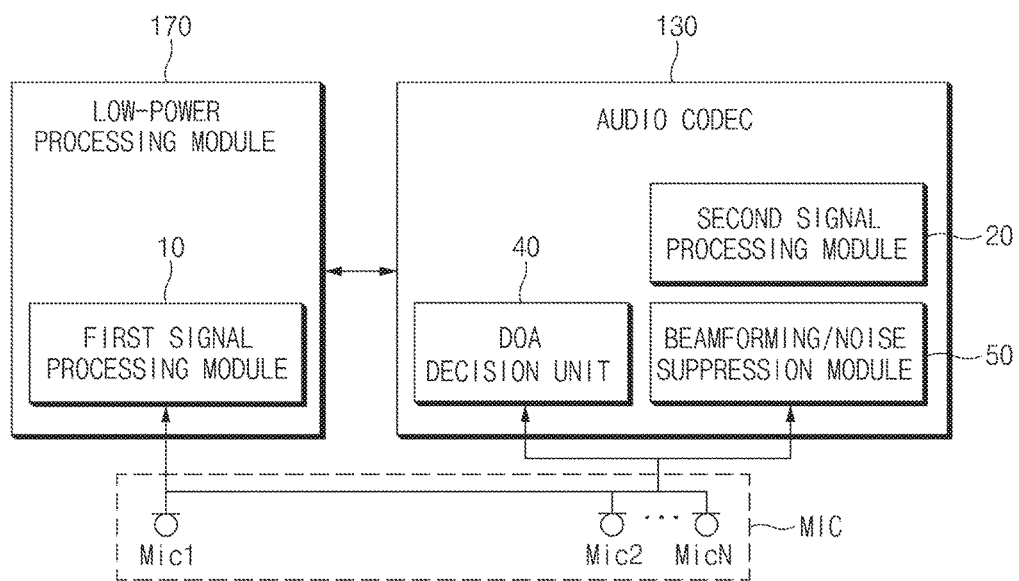
FIG. 6 illustrates an electronic device which supports low-power microphone integrated use based on a low-power processing module and an audio codec, according to an embodiment of the present disclosure.

FIG. 6 illustrates an electronic device which supports low-power microphone integrated use based on a low-power processing module and an audio codec, according to an embodiment of the present disclosure.

Referring to FIG. 6, an electronic device associated with microphone integrated use, according to an embodiment of the present disclosure may include the low-power processing module 170, which includes the first signal processing module 10, the audio codec 130, which includes the DOA decision unit 40, the beamforming/noise suppression module 50, and the second signal processing module 20.

When execution of a detail recognition function of a voice recognition function is set or requested, the first signal processing module 10 of the low-power processing module 170 may control to activate the microphone module MIC. Alternatively, the first signal processing module 10 of the low-power processing module 170 may detect specific audio data by comparing audio data, which a first microphone Mic1 collects, with a first voice recognition model 51. When the specific audio data is detected, the first signal processing module 10 of the low-power processing module 170 may transfer a wakeup command to the DOA decision unit 40 of the audio codec 130.

The DOA decision unit 40 of the audio codec 130 may collect audio data from a microphone module MIC that the first signal processing module 10 activates. In this operation, the DOA decision unit 40 of the audio codec 130 may temporarily store (buffer) the collected audio data. When receiving the wakeup command from the first signal processing module 10 of the low-power processing module 170, the DOA decision unit 40 may determine a direction of arrival and generation of information, based on the buffered audio data. For example, the DOA decision unit 40 may calculate a parameter associated with weighting a plurality of microphones Mic1 to MicN included in the microphone module MIC.

The DOA decision unit 40 of the audio codec 130 may transfer the calculated weight parameter to the beamforming/noise suppression module 50 of the audio codec 130 performing beamforming/noise suppression. The DOA decision unit 40 of the audio codec 130 may use audio data, which a first microphone Mic1 collects, and audio data, which second to N-th microphones Mic2 to MicN collect, to determine a direction of arrival. Audio data used to determine a direction of arrival may be audio data used to detect specific audio data.

In the case where the low-power processing module 170 detects specific audio data, the DOA decision unit 40 of the audio codec 130 may buffer collected audio data. When receiving a wakeup command from the first signal processing module 10 of the low-power processing module 170, the DOA decision unit 40 of the audio codec 130 may determine a direction of arrival using the buffered audio data. If the wakeup command is not received after buffering specific audio data, the DOA decision unit 40 of the audio codec 130 may delete the buffered data or may overwrite the buffered data with subsequently received data. The DOA decision unit 40 may calculate a weight parameter, based on audio data, and may transfer the weight parameter to the beamforming/noise suppression module 50.

The beamforming/noise suppression module 50 of the audio codec 130 may apply weights to the microphones Mic1 to MicN according to a weight parameter received from the DOA decision unit 40 of the audio codec 130. The beamforming/noise suppression module 50 of the audio codec 130 may compute audio data that undergoes noise suppression or is obtained by performing beamforming of audio data, which the microphones Mic1 to MicN collect, in a specific direction. The beamforming/noise suppression module 50 may transfer audio data, to which at least one of beamforming or noise suppression is applied, to the second signal processing module 20 of the audio codec 130. The beamforming/noise suppression module 50 of the audio codec 130 may buffer audio data that the microphones Mic1 to MicN collect. The beamforming/noise suppression module 50 of the audio codec 130 may receive information of a specific audio data section from the DOA decision unit 40 of the audio codec 130. Upon weighting, the beamforming/noise suppression module 50 of the audio codec 130 may exclude buffered audio data corresponding to the specific audio data section. The beamforming/noise suppression module 50 of the audio codec 130 may apply a weight to pieces of audio data corresponding to a function execution command section.

The second signal processing module 20 of the audio codec 130 may receive audio data, which is obtained by applying beamforming or noise suppression to audio data collected by the microphones Mic1 to MicN, from the beamforming/noise suppression module 50. The second signal processing module 20 of the audio codec 130 may execute voice recognition of the received audio data. In this operation, the second signal processing module 20 of the audio codec 130 may execute voice recognition, based on the second signal processing module 20. Additionally or generally, the second signal processing module 20 of the audio codec 130 may preprocess the audio data thus received. The second signal processing module 20 of the audio codec 130 may transfer a voice recognition result to the audio data processing module 180 to control to perform a function according to the recognition result. Alternatively, the audio codec 130 may control to perform a specific function A first microphone Mic1 of the microphone module MIC may be coupled to the first signal processing module 10 of the low-power processing module 170, the DOA decision unit 40 of the audio codec 130, and the beamforming/noise suppression module 50 of the audio codec 130. Second to N-th microphones Mic2 to MicN may be coupled to the DOA decision unit 40 of the audio codec 130 and the beamforming/noise suppression module 50 of the audio codec 130. The microphone MIC may be activated according to a control of the first signal processing module 10. For example, the first microphone Mic1 may transfer first audio data corresponding to specific audio data to the DOA decision unit 40 of the audio codec 130 and the beamforming/noise suppression module 50 of the audio codec 130, respectively. The second to N-th microphones Mic2 to MicN may transfer the first audio data to the DOA decision unit 40 of the audio codec 130 and the beamforming/noise suppression module 50 of the audio codec 130, respectively. Second audio data collected by the microphones Mic1 to MicN after the first audio data is collected may be transferred to the beamforming/noise suppression module 50 of the audio codec 130 so as to be converted into third audio data (parameter-processed audio data) to which at least one of beamforming or noise suppression is applied. The third audio data thus converted may be transferred to the second signal processing module 20.

After calculating and transferring a weight parameter, the DOA decision unit 40 of the audio codec 130 may buffer audio data collected until receiving a wakeup command from the first signal processing module 10 of the low-power processing module 170. According to an embodiment of the present disclosure, when receiving the wakeup command, the DOA decision unit 40 of the audio codec 130 may determine a direction of arrival associated with buffered audio data corresponding to the wakeup command. For example, when "Hi Galaxy" is specific audio data, the DOA decision unit 40 of the audio codec 130 may receive the wakeup command from the first signal processing module 10 at a point in time when "Hi Galaxy" is collected, and may respond to the wakeup command to determine a direction of arrival based on audio data corresponding to "Hi Galaxy". According to various embodiments of the present disclosure, the DOA decision unit 40 of the audio codec 130 may determine a direction of arrival associated with audio data collected in real time or periodically and may transfer the decision result of the direction of arrival to the beamforming/noise suppression module 50 of the audio codec 130.

The DOA decision unit 40 is illustrated as being placed at the low-power processing module 170 and as being placed at the audio codec 130 and the beamforming/noise suppression module 50 is illustrated as being placed at the audio codec 130. However, a description on each device component may not be limited to the above-described embodiments. Positions of device components may be modified according to a change in a design manner. According to an embodiment of the present disclosure, the DOA decision unit 40 and the beamforming/noise suppression module 50 may be disposed at the audio data processing module 180. In FIGS. 5 and 6, the first signal processing module 10 is illustrated as being disposed at the low-power processing module 170. However, the first signal processing module 10 can be placed at the audio codec 130. Furthermore, the second signal processing module 20 is illustrated as being disposed at the audio codec 130. However, the second signal processing module 20 may be disposed at the audio data processing module 180.

As described above, the electronic device 100 according to various embodiments of the present disclosure may include the first signal processing module, which activates the plurality of microphones Mic1 to MicN and detects specific audio data using first audio data, which a first microphone Mic1 collects, from among audio data collected by the plurality of microphones Mic1 to MicN, a DOA decision unit 40, which determines a direction of arrival using the first audio data, if the specific audio data is detected, the beamforming/noise suppression module 50, which applies at least one of beamforming or noise suppression to collected audio data according to the direction of arrival thus determined, and generates parameter-processed audio data, and the second signal processing module 20, which executes voice recognition of the parameter-processed audio data.

According to various embodiments of the present disclosure, when the specific audio data is detected, the first signal processing module 10 may generate a wakeup command and may transfer the wakeup command to the DOA decision unit 40.

According to various embodiments of the present disclosure, the DOA decision unit 40 may buffer first audio data which the plurality of microphones Mic1 to MicN collects before receiving the wakeup command.

According to various embodiments of the present disclosure, the DOA decision unit 40 may determine a sound obtaining direction using the pieces of the buffered first audio data, when the wakeup command is received.

According to various embodiments of the present disclosure, the beamforming/noise suppression module 50 may buffer audio data which the plurality of microphones Mic1 to MicN collects before receiving the direction of arrival.

According to various embodiments of the present disclosure, the beamforming/noise suppression module 50 may apply at least one of the beamforming or the noise suppression to second audio data, which the plurality of microphones Mic1 to MicN collects, excluding the first audio data.

According to various embodiments of the present disclosure, the second signal processing module 20 may control execution of a specific function corresponding to the voice-recognized result.

According to various embodiments of the present disclosure, the electronic device 10 may include the low-power processing module 170 in which the first signal processing module 10 and the DOA decision unit 40 are disposed and the audio codec 130 or the audio data processing module 180 in which the beamforming/noise suppression module 50 and the second signal processing module 20 are disposed.

According to various embodiments of the present disclosure, the electronic device 100 may include a low-power processing module 170 in which the first signal processing module 10 is disposed and an audio codec 130 or an audio data processing module 180 in which the DOA decision unit 40, the beamforming/noise suppression module 50, and the second signal processing module 20 are disposed.

The single channel signal processing module 11 may process first audio data collected by a portion of a plurality of microphones. According to an embodiment of the present disclosure, at least a portion of the single channel signal processing module 11 may be implemented by a first processor. The first processor may be a general-purpose processor (or a communication processor (CP)) of an electronic device or may be an application processor (AP). The first processor may be separated from the general-purpose processor of the electronic device and may be a dedicated processor for implementing an audio data processing function. A first voice recognition module 12 may execute voice recognition of first audio data. The first voice recognition module 12 may execute voice recognition of first audio data.

According to an embodiment of the present disclosure, at least a portion of the first voice recognition module 12 may be implemented by a first processor.

A multi-channel signal processing module 30 may process second audio data which a plurality of microphones collects. According to an embodiment of the present disclosure, at least a portion of the multi-channel signal processing module 30 may be implemented by a second processor. The second processor may be a general-purpose processor (or a communication processor (CP)) of an electronic device or may be an application processor (AP). The second processor may be separated from the general-purpose processor of the electronic device and may be a dedicated processor for implementing an audio data processing function.

At least one of the preprocessing module 21 or the second voice recognition module 22 of the second signal processing module 20 may perform a function associated with voice recognition of second audio data. According to an embodiment of the present disclosure, at least a portion of a preprocessing module 21 or a second voice recognition module 22 may be implemented by a second processor.

According to various embodiments of the present disclosure, an electronic device may include a plurality of microphones operatively coupled to the electronic device and an audio data processing module implemented by at least one processor. The audio data processing module may recognize a specified command, based on first audio data collected using a portion of the plurality of microphones and may execute a function or an application corresponding to second audio data collected using the plurality of microphones, when the specified command is recognized.

According to various embodiments of the present disclosure, the audio data processing module may include a single channel signal processing module which receives an audio signal of at least one channel corresponding to the portion of the plurality of microphones and generates the first audio data, based on a result of performing a specified audio process associated with the audio signal of the at least one channel, a first voice recognition module which recognizes the specified command through voice recognition of the first audio data, a multi-channel signal processing module which receives a multi-channel audio signal corresponding to each of the plurality of microphones and generates the second audio data, based on a result of performing a specified audio process associated with the multi-channel audio signal, and a second voice recognition module which performs the function or application through voice recognition of the second audio data.

According to various embodiments of the present disclosure, the first voice recognition module may be implemented with a first process operatively coupled to the portion of the plurality of microphones, and the second voice recognition module may be implemented with a second processor operatively coupled to the plurality of microphones.

According to various embodiments of the present disclosure, when recognizing the specified command, the first voice recognition module may activate at least one remaining microphone of the plurality of microphones other than the portion of the plurality of microphones or the multi-channel signal processing module.

According to various embodiments of the present disclosure, the multi-channel signal processing module may include at least one of a sound source direction detecting unit which recognizes a sound source direction of the multi-channel audio signal, a beam forming unit which adjusts a parameter of the multi-channel audio signal so as to adjust a receiving gain of a specific direction, a noise suppression unit which adjusts a parameter of the multi-channel audio signal so as to suppress receiving of a sound source of a specific direction associated with a noise, or an echo cancellation unit which cancels an echo component included in the multi-channel audio signal.

According to various embodiments of the present disclosure, the first voice recognition module may determine whether at least one of utterance character information or speaker classification information corresponding to the specified command is included in the first audio data.

According to various embodiments of the present disclosure, when the specific audio data is detected, the single channel signal processing module may transfer a command, set to activate the multi-microphone processing module, to the multi-microphone processing module.

According to various embodiments of the present disclosure, the electronic device may include an audio codec in which at least one of a single channel signal processing module or the multi-channel signal processing module is disposed and an audio data processing module in which the second voice recognition module is disposed.

According to various embodiments of the present disclosure, the electronic device may include a low-power processing module in which the single channel signal processing module is disposed and an audio data processing module in which the multi-channel signal processing module and the second voice recognition module are disposed.

According to various embodiments of the present disclosure, the electronic device may include a low-power processing module in which the single channel signal processing module is disposed, an audio code in which the multi-channel signal processing module is disposed, and an audio data processing module in which the second voice recognition module is disposed.

Figure 7:
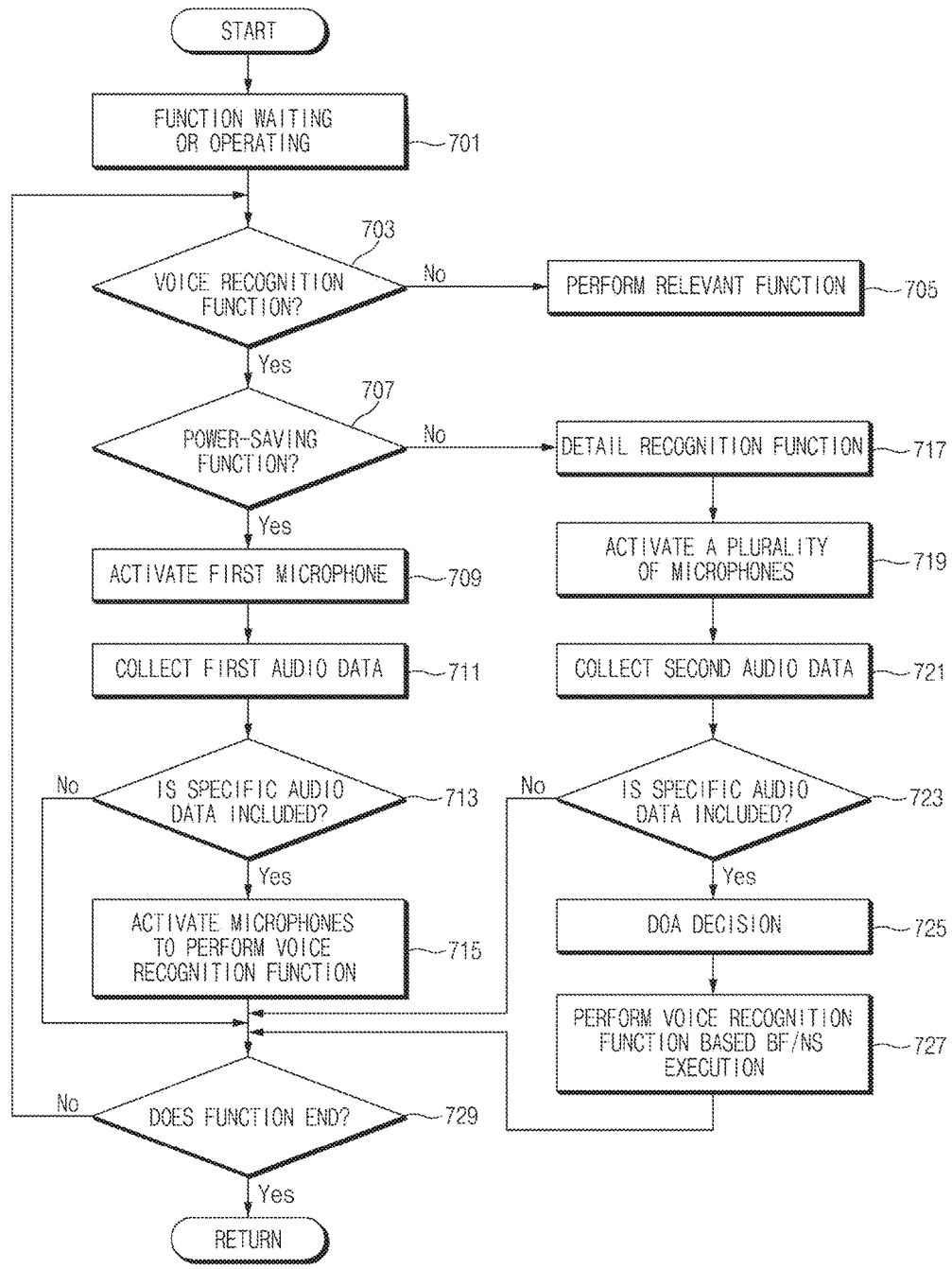
FIG. 7 illustrates a microphone operating method according to an embodiment of the present disclosure.

FIG. 7 illustrates a microphone operating method according to an embodiment of the present disclosure.

Referring to FIG. 7, in operation 701, the audio data processing module 180 of the electronic device 100 may wait or operate. With regard to waiting or operating, for example, the electronic device 100 may maintain a sleep state, may output a waiting screen, or may execute a specific sound source reproduction function.

In operation 703, the audio data processing module 180 may determine whether an event associated with execution of a voice recognition function exists. For example, when a specific input event is generated, the audio data processing module 180 may determine whether the input event is an input event associated with execution of the voice recognition function. Alternatively, the audio data processing module 180 may determine whether setting associated with execution of the voice recognition function exists.

When the setting associated with execution of the voice recognition function does not exist, a function associated with the input event or setting is performed in operation 705. For example, the audio data processing module 180 may change a previously executed function in response to the kind of the input event or may control to execute a new function. According to various embodiments of the present disclosure, operation 703 may be omitted if the voice recognition function is set to be executed by default.

When an event associated with execution of the voice recognition function is generated or the setting associated therewith exists in operation 703, in operation 707, the audio data processing module 180 may determine whether a power saving function of the voice recognition function is set or whether an event or setting associated with execution of the power saving function exists. The power saving function may be a voice recognition function corresponding to a way of generating a wakeup command (or an active command, a command associated with module activation associated with multi-microphone processing, and or the like) using one microphone (or at least one of a plurality of microphones) and activating a plurality of microphones in generating the wakeup command. The audio data processing module 180 may provide a setting screen associated with setting of the power saving function.

When the power saving function is set or an event associated with the power saving function is generated, in operation 709, the electronic device 100 may control to activate a first microphone Mic1. In operation 711, the electronic device 100 may collect first audio data using the first microphone Mic1 activated. In operation 713, the electronic device 100 may determine whether the collected first audio data includes specific audio data (or, whether similarity between the collected first audio data and a trained statistical model is within a constant error range). The specific audio data may be at least one of audio data for generating a wakeup command or the trained statistical model. Activating of the first microphone Mic1 and generating of the wakeup command may be performed by a first signal processing module 10 that is included in at least one of the low-power processing module 170 and the audio codec 130. The audio data processing module 180 may stop a process associated with the voice recognition function while the low-power processing module 170 and the an audio codec 130 employ the first signal processing module 10, thereby saving power needed to operate the audio data processing module 180.

When the specific audio data is determined in operation 713 as being included in the first audio data, in operation 715, the electronic device 100 may control to activate a plurality of microphones and to execute the voice recognition function. For example, the electronic device 100 may perform a multi-microphone process associated with audio data collected after the first audio data and may execute voice recognition of the audio data undergoing the multi-microphone process. In this operation, the electronic device 100 may preprocess the audio data undergoing the multi-microphone process. The electronic device may execute voice recognition of the preprocessed audio data using the second voice recognition model 53. Alternatively, the electronic device 100 may transfer the preprocessed audio data to a voice recognition server device and may receive a voice recognition result therefrom.

When the voice recognition result is obtained, the electronic device 100 may control to perform a specific function in response to the voice recognition result. For example, the electronic device 100 may control to perform a specific function in response to a voice recognition result obtained as the voice recognition function. According to an embodiment of the present disclosure, based on the voice recognition result, the electronic device 100 may enter a sleep state, may change a broadcasting receiving channel, may control to reproduce a specific sound source, may form a communication channel with another electronic device, may connect to a specific server device, and the like. Execution of a specific function may be changed or established according to a specific setting, a user setting, or the like.

When the power saving function is not set or an event is not generated in operation 707, in operation 717, the electronic device 100 may recognize an event or setting associated with execution of the voice recognition function as setting of a detail recognition function. Accordingly, in operation 719, the electronic device 100 may control to activate a plurality of microphones Mic1 to MicN. In operation 721, the electronic device 100 may collect audio data using the microphones Mic1 to MicN. In operation 723, the electronic device 100 may determine whether specific audio data is included in the collected audio data. In the case where the specific audio data is included in the collected audio data, the electronic device 100 determines a direction of arrival in operation 725, and in operation 727, the electronic device 100 may control to perform a beamforming/noise suppression-based voice recognition function.

According to an embodiment of the present disclosure, at least one of the low-power processing module 170 or the audio codec 130 of the electronic device 100 may use the first signal processing module 10 which activates a plurality of microphones Mic1 to MicN and detects specific audio data with regard to generating and processing a wakeup command. Furthermore, a multi-channel signal processing module 30, which performs a multi-microphone processing function of the microphones Mic1 to MicN, or the DOA decision unit 40 and the beamforming/noise suppression module 50 may operate in an audio codec 130 or an audio data processing module 180. The DOA decision unit 40 may operate in the low-power processing module 170. A second signal processing module 20 may perform a voice recognition function of audio data undergoing a multi-microphone process and may operate in one of the audio codec 130 and the audio data processing module 180.

When determining a direction of arrival, the electronic device 100 may use specific audio data used to generate a wakeup command. Furthermore, when processing a parameter, the electronic device 100 may execute voice recognition of audio data from which a section of specific audio data is excluded. The electronic device 100 may continuously perform generation of a wakeup command and a voice recognition function using a plurality of microphones Mic1 to MicN, thereby supporting the voice recognition function seamlessly.

In operation 729, the electronic device 100 may determine whether an event associated with a function end is generated. When an event associated with a function end is generated, the electronic device 100 may terminate the voice recognition function, and the method may proceed to a previous operation of operation 701. When an event associated with a function end is not generated, the method proceeds to operation 703 or operation 707, in which the electronic device 100 may repeat the corresponding operations.

At least a portion of operations (e.g., operations 701 to 729) of the method according to various embodiments of the present disclosure may be performed sequentially, in parallel, or iteratively. Alternatively, a portion of the operations according to various embodiments of the present disclosure may be omitted, or a new operation may be added thereto.

As described above, according to various embodiments of the present disclosure, a microphone operating method according to various embodiments of the present disclosure may include determining a setting associated with execution of a power saving function or a detail recognition function or generation of an event associated therewith, activating a plurality of microphones based on audio data, which a first microphone collects at execution of the power saving function, and a multi-microphone process and voice recognition of the collected audio data (a power saving function based voice recognition operation), and calculating and applying of a parameter according to a determination of a sound obtaining direction and voice recognition, using audio data collected by the plurality of microphones at execution of the detail recognition function (a detail recognition function based voice recognition operation).

According to various embodiments of the present disclosure, the power saving function based voice recognition operation may include determining specific audio data is included in audio data collected by the first microphone, activating a plurality of microphones Mic1 to MicN when the specific audio data is detected, performing a multi-microphone process associated with audio data collected by the plurality of microphones Mic1 to MicN, and executing voice recognition of the audio data undergoing the multi-microphone process.

According to various embodiments of the present disclosure, the determining may include performing at least a portion of a plurality of preprocessing functions with respect to audio data collected by the first microphone Mic1 and executing voice recognition of the audio data collected by the first microphone Mic1.

According to various embodiments of the present disclosure, the determining may include generating a wakeup command when the specific audio data is detected and transferring the wakeup command to a module performing the multi-microphone process.

According to various embodiments of the present disclosure, the activating of the plurality of microphones may include allowing a module, performing the multi-microphone process, to activate the plurality of microphones Mic1 to MicN in response to the wakeup command.

According to various embodiments of the present disclosure, the executing of voice recognition may include performing a plurality of preprocessing functions of the audio data undergoing the multi-microphone process and executing voice recognition of the audio data undergoing the multi-microphone process, based on a second voice recognition model 53.

According to various embodiments of the present disclosure, the multi-microphone process may include at least one of detecting a direction of arrival associated with audio data collected by the plurality of microphones, performing beamforming according to the direction of arrival detected, suppressing a noise by suppressing obtaining of a sound of a specific direction with respect to the audio data, and performing echo cancellation associated with the pieces of audio data.

According to various embodiments of the present disclosure, the detail recognition function based voice recognition operation may include activating a plurality of microphones Mic1 to MicN, detecting specific audio data using audio data collected by a first microphone Mic1, from among audio data collected by the plurality of microphones Mic1 to MicN, calculating the parameter using the audio data when the specific audio data is detected, and executing voice recognition of the parameter-processed audio data.

According to various embodiments of the present disclosure, generating a wakeup command when the specific audio data is detected and transferring the wakeup command to a module determining the sound obtaining direction may be further included.

According to various embodiments of the present disclosure, the calculating of a parameter may include buffering audio data which the plurality of microphones collects before receiving the wakeup command, and calculating the parameter according to a determination of a sound obtaining direction using the buffered audio data, when the wakeup command is received.

According to various embodiments of the present disclosure, the applying of the parameter may include audio data which the plurality of microphones collects before determining the sound obtaining direction, and applying at least one of the beamforming or the noise suppression to audio data, from which audio data used to detect the specific audio data are excluded, from among audio data collected by the plurality of microphones Mic1 to MicN.

According to various embodiments of the present disclosure, executing a specific function corresponding to the voice-recognized result may be further included.

Figure 8:
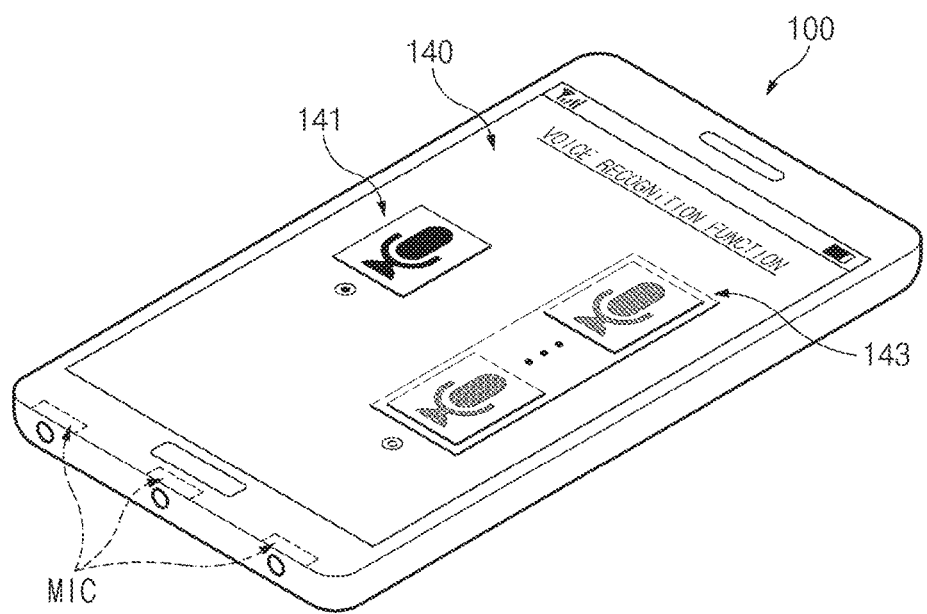
FIG. 8 illustrates a screen interface of an electronic device according to an embodiment of the present disclosure.

FIG. 8 illustrates a screen interface of an electronic device according to various embodiments of the present disclosure.

Referring to FIG. 8, when an event associated with setting of a voice recognition function is generated, a display 140 may output a power saving function selecting icon 141 and a detail recognition function selecting icon 143 as illustrated in FIG. 8. When an event associated with activation of the voice recognition function is generated, the audio data processing module 180 may control output a setting screen as illustrated in FIG. 8. The audio data processing module 180 may provide a menu or icon including a voice recognition function activating or inactivating item. According to various embodiments of the present disclosure, when the voice recognition function is set to be performed by default, the menu or icon including the function activating or inactivating item may not be provided (or may be omitted).

When the power saving function selecting icon 141 is selected, the first signal processing module 10 included in either the low-power processing module 170 or the audio codec 130 of the electronic device 100 may activate a first microphone Mic1 to detect specific audio data. When the specific audio data is detected, the first signal processing module 10 may generate a wakeup command and may transfer the wakeup command to a multi-channel signal processing module 30. Alternatively, the first signal processing module 10 may transfer the wakeup command to the DOA decision unit 40. The multi-channel signal processing module 30 may be disposed at the audio codec 130 or the audio data processing module 180.

When receiving the wakeup command, the multi-channel signal processing module 30 may activate the plurality of microphones Mic1 to MicN and may perform a multi-microphone process associated with the collected audio data. Alternatively, the DOA decision unit 40 may determine a direction of arrival associated with the collected audio data and may transfer the direction of arrival to the beamforming/noise suppression module 50. The beamforming/noise suppression module 50 may collect audio data to which beamforming or noise suppression is applied according to the direction of arrival thus determined. The DOA decision unit 40 may be disposed at the low-power processing module 170 or the audio codec 130. The beamforming/noise suppression module 50 may be disposed at the audio codec 130 or the audio data processing module 180. As described above, the low-power processing module 170, which is driven by relatively low power, may process audio data of which the load or computation is relatively less, and the audio codec 130, which is driven by relatively high power, or the audio data processing module 180 may process audio data of which the load is relatively more.

Audio data undergoing a multi-microphone process may be provided to the second signal processing module 20 that is arranged at the audio codec 130 or the audio data processing module 180. The second signal processing module 20 may preprocess the received audio data undergoing the multi-microphone process and may execute voice recognition using the second voice recognition model 53 or a voice recognition server device. The second signal processing module 20 may control to perform a specific function according to a voice recognition result. Alternatively, a device component including the second signal processing module 20 may control to perform a specific function according to a voice recognition result in response to setting information.

When the detail recognition function selecting icon 143 is selected, the electronic device 100 may activate a plurality of microphones Mic1 to MicN. The electronic device 100 may detect specific audio data using a first microphone Mic1 of the plurality of microphones Mic1 to MicN. When the specific audio data is detected, the electronic device 100 may determine a direction of arrival using audio data that is used to detect audio data. The electronic device 100 may apply a beamforming or noise suppression function to audio data, continuously collected by the microphones Mic1 to MicN, except the specific audio data. The electronic device 100 may preprocess the beam-formed or noise-suppressed audio data and may execute regulation voltage of the preprocessed audio data.

The electronic device 100 may manage the power saving function selecting icon 141 or the detail recognition function selection icon 143, for example, in a toggle manner. For example, when the power saving function selecting icon 141 is selected, the detail recognition function and the detail recognition function selection icon 143 may be automatically inactivated according to a control of the electronic device 100. Furthermore, in the case where the detail recognition function selection icon 143 is selected, the power saving function and the power saving function selecting icon 141 may be automatically inactivated according to a control of the electronic device 100. According to various embodiments of the present disclosure, the electronic device 100 may provide a selection item for inactivating or activating the voice recognition function.

As described above, an electronic device 100 and its operating method according to various embodiments of the present disclosure may use two or more processors to support such that it is possible to wait for a voice input while maintaining low power even at a waiting state. Furthermore, the electronic device 100 and the operating method according to an embodiment of the present disclosure may support to obtain high-quality sound using a multi-microphone while waiting for a voice input at a low-power state. In addition, the electronic device 100 and the operating method according to an embodiment of the present disclosure may process to receive a wakeup command and a function execution command seamlessly using at least one processor. According to various embodiments of the present disclosure, it is possible to receive natural language voice while waiting at a low-power state, thereby improving convenience of a user.

As described above, a microphone operating method according to an embodiment of the present disclosure may include collecting first audio data using a portion of a plurality of microphones operatively coupled to an electronic device, recognizing a specified command, based on the first audio data, and executing a function or an application, corresponding to second audio data collected using all the plurality of microphones, based on recognition of the specified command.

According to various embodiments of the present disclosure, the microphone operating method may further include at least one of wherein collecting the first audio data comprises performing a single channel signal processing operation of generating the first audio data, based on a result of performing a specified audio process associated with an audio signal of at least one channel corresponding to a portion of the plurality of microphones; wherein recognizing the specified command comprises performing a first voice recognition operation of recognizing the specified command through voice recognition of the first audio data; wherein executing the function or application comprises performing a multi-channel signal processing operation of generating the second audio data, based on a result of performing a specified audio process associated with a multi-channel audio signal corresponding to each of the plurality of microphones; or wherein executing the function or application comprises performing a second voice recognition operation of performing the function or the application through voice recognition of the second audio data.

According to various embodiments of the present disclosure, the microphone operating method may further include at least one of performing the first voice recognition operation by a first processor operatively coupled to the at least one microphone or performing the second voice recognition by a second processor operatively coupled to the plurality of microphones.

According to various embodiments of the present disclosure, the microphone operating method may further include at least one of activating, when the specified command is recognized, remaining microphones of the plurality of microphones other than the portion of the plurality of microphones or processing multi-channel signal when the specified command is recognized.

According to various embodiments of the present disclosure, the microphone operating method may further include at least one of determining a sound source direction of the multi-channel audio signal, based on positions where microphones corresponding to the multi-channel audio signal are disposed, adjusting a parameter of the multi-channel audio signal so as to tune an input gain of a specific direction, adjusting a parameter of the multi-channel audio signal so as to suppress receiving of sound source of a specific direction associated with a noise, or cancelling an echo component included in the multi-channel audio signal.

According to various embodiments of the present disclosure, the first voice recognition operation may include determining whether at least one of utterance character information or speaker classification information corresponding to the specified command is included the first audio data.

According to various embodiments of the present disclosure, the microphone operating method may further include transferring a command, set to process the multi-channel audio signal, to a multi-channel processing module, when the specific audio data is detected.

According to various embodiments of the present disclosure, the microphone operating method may further include at least one of setting at least one of the single channel signal processing operation or the multi-channel signal processing operation to an audio codec or setting the second voice recognition operation to an audio data processing module.

According to various embodiments of the present disclosure, the microphone operating method may further include at least one of setting the single channel signal processing operation to a low-power processing module or setting the multi-channel signal processing operation and the second voice recognition operation to an audio data processing module.

According to various embodiments of the present disclosure, the microphone operating method may further include at least one of setting the single channel signal processing operation to a low-power processing module, setting the multi-channel signal processing operation to an audio codec, or setting the second voice recognition operation to an audio data processing module.

Figure 9:
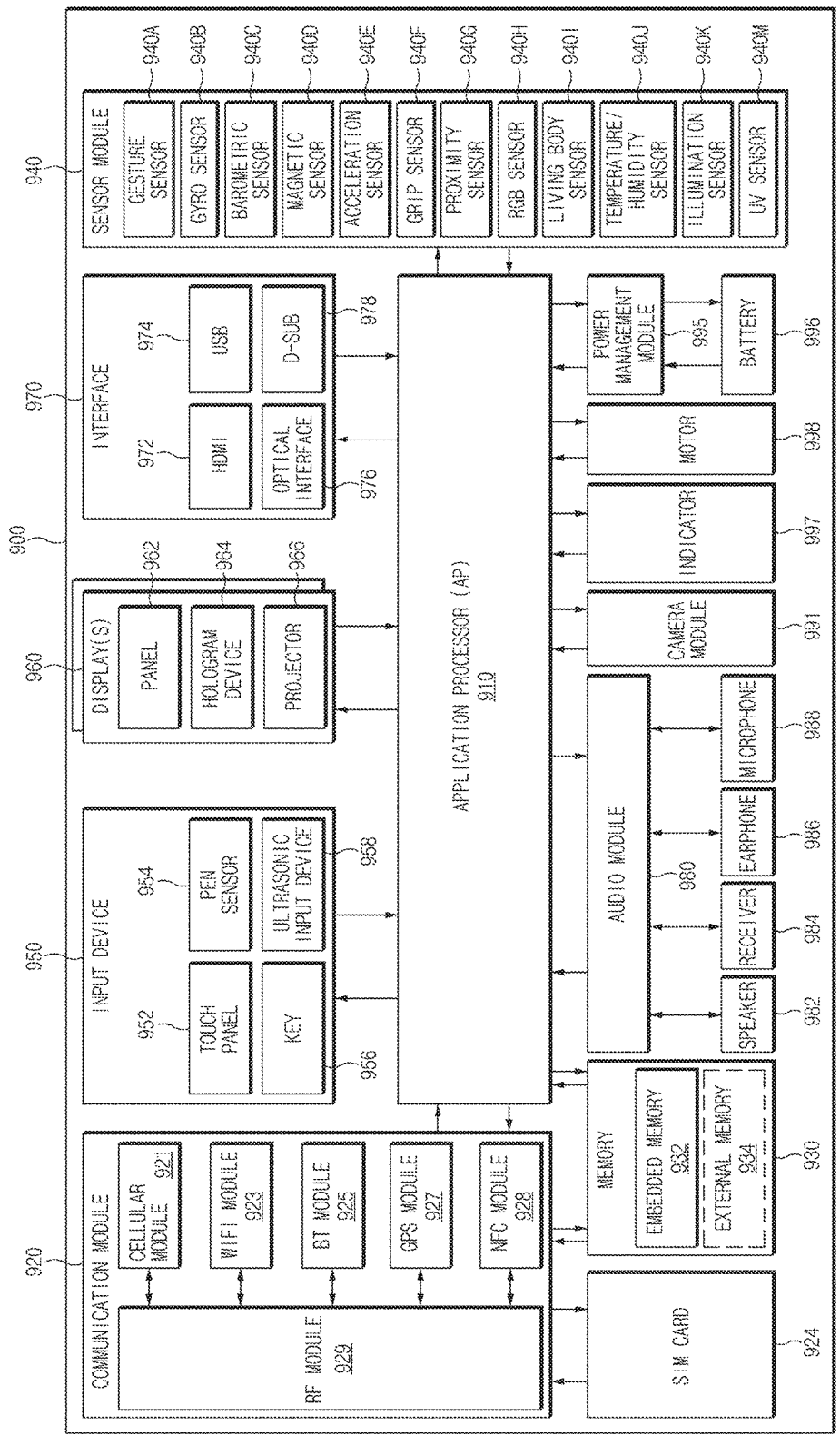
FIG. 9 illustrates a hardware configuration of an electronic device according to an embodiment of the present disclosure.

FIG. 9 illustrates a hardware configuration of an electronic device according to various embodiments of the present disclosure.

Referring to FIG. 9, an electronic device 900 may include a part or all of components of the electronic device 100 shown in FIG. 1. The electronic device 900 may include one or more application processors (AP) 910, a communication module 920 (e.g., the communication interface 110), a subscriber identification module (SIM) card 924, a memory 930 (e.g., the memory 150), a sensor module 940, an input device 950 (e.g., the input/output interface 120), a display(s) 960 (e.g., the display 140), an interface 970, an audio module 980 (e.g., the input/output interface 120), a camera module 991, a power management module 995, a battery 996, an indicator 997, or a motor 998.

The AP 910 may drive an operating system (OS) or an application to control a plurality of hardware or software components connected to the AP 910 and may process and compute a variety of data including multimedia data. The AP 910 may be implemented with a System on Chip (SoC), for example. According to an embodiment of the present disclosure, the AP 910 may further include a graphic processing unit (GPU) (not illustrated).

The communication module 920 (e.g., the communication interface 110) may transmit and receive data when there are conveyed communications between other electronic devices connected with the electronic device 900 through a network. According to an embodiment of the present disclosure, the communication module 920 may include a cellular module 921, a Wi-Fi module 923, a Bluetooth (BT) module 925, a global positioning system (GPS) module 927, a near field communication (NFC) module 928, and a radio frequency (RF) module 929.

The cellular module 921 may provide voice communication, video communication, a character service, an Internet service, and the like through a communication network (e.g., LTE, LTE-A, CDMA, WCDMA, UMTS, WiBro, GSM, or the like). The cellular module 921 may perform identification and authentication of an electronic device within a communication network using, for example, a subscriber identification module (e.g., the SIM card 924). According to an embodiment of the present disclosure, the cellular module 921 may perform at least a portion of functions that the AP 910 provides. For example, the cellular module 921 may perform at least a portion of a multimedia control function.

According to an embodiment of the present disclosure, the cellular module 921 may include a communication processor (CP). Furthermore, the cellular module 921 may be implemented with, for example, a SoC. Although components such as the cellular module 921 (e.g., a communication processor), the memory 930, the power management module 995, and the like are illustrated as being components independent of the AP 910, the AP 910 according to an embodiment of the present disclosure may be implemented to include at least a portion (e.g., a cellular module 921) of the above components.

According to an embodiment of the present disclosure, the AP 910 or the cellular module 921 (e.g., a communication processor) may load and process an instruction or data received from nonvolatile memories respectively connected thereto or from at least one of other elements at the nonvolatile memory. The AP 910 or the cellular module 921 may store data received from at least one of other elements or generated by at least one of other elements at a nonvolatile memory.

Each of the Wi-Fi module 923, the BT module 925, the GPS module 927, and the NFC module 928 may include a processor for processing data exchanged through a corresponding module, for example. In FIG. 9, the cellular module 921, the Wi-Fi module 923, the BT module 925, the GPS module 927, and the NFC module 928 may be illustrated as being separate blocks, respectively. According to an embodiment of the present disclosure, at least a portion (e.g., two or more components) of the cellular module 921, the Wi-Fi module 923, the BT module 925, the GPS module 927, and the NFC module 928 may be included within one Integrated Circuit (IC) or an IC package. For example, at least a portion (e.g., a communication processor corresponding to the cellular module 921 and a Wi-Fi processor corresponding to the Wi-Fi module 923) of communication processors corresponding to the cellular module 921, the Wi-Fi module 923, the BT module 925, the GPS module 927, and the NFC module 928 may be implemented with one SoC.

The RF module 929 may transmit and receive data, for example, an RF signal. Although not illustrated, the RF module 929 may include a transceiver, a power amplifier module (PAM), a frequency filter, or low noise amplifier (LNA). Furthermore, the RF module 929 may further include a part for transmitting and receiving an electromagnetic wave in a space in wireless communication: a conductor or a conducting wire. In FIG. 9, the cellular module 921, the Wi-Fi module 923, the BT module 925, the GPS module 927, and the NFC module 928 may be illustrated as sharing one RF module 929, but according to an embodiment of the present disclosure, at least one of the cellular module 921, the Wi-Fi module 923, the BT module 925, the GPS module 927, or the NFC module 928 may transmit and receive an RF signal through a separate RF module.

The SIM card 924 may be a card that includes a subscriber identification module and may be inserted to a slot formed at a specific position of the electronic device 900. The SIM card 924 may include unique identify information (e.g., integrated circuit card identifier (ICCID)) or subscriber information (e.g., integrated mobile subscriber identity (IMSI)).

The memory 930 (e.g., the memory 130) may include an embedded memory 932 or an external memory 934. For example, the embedded memory 932 may include at least one of a volatile memory (e.g., dynamic RANI (DRAM), static RAM (SRAM), synchronous dynamic RAM (SDRAM), etc.), or a nonvolatile memory (e.g., a dynamic random access memory (DRAM), a static RAM (SRAM), or a synchronous DRAM (SDRAM)) and a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the embedded memory 932 may be a solid state drive (SSD). The external memory 934 may include a flash drive, for example, compact flash (CF), secure digital (SD), micro secure digital (Micro-SD), mini secure digital (Mini-SD), extreme digital (xD) or a memory stick. The external memory 934 may be functionally connected with the electronic device 900 through various interfaces. According to an embodiment of the present disclosure, the electronic device 900 may further include a storage device (or storage medium) such as a hard disk drive.

The sensor module 940 may measure a physical quantity or may detect an operation state of the electronic device 900. The sensor module 940 may convert the measured or detected information to an electric signal. The sensor module 940 may include at least one of a gesture sensor 940A, a gyro sensor 940B, a pressure sensor 940C, a magnetic sensor 940D, an acceleration sensor 940E, a grip sensor 940F, a proximity sensor 940G, a color sensor 940H (e.g., red, green, blue (RGB) sensor), a living body sensor 940I, a temperature/humidity sensor 940J, an illuminance sensor 940K, or an ultraviolet (UV) sensor 940M. Additionally or generally, although not illustrated, the sensor module 940 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 940 may further include a control circuit for controlling at least one or more sensors included therein.

The input device 950 may include a touch panel 952, a (digital) pen sensor 954, a key 956, or an ultrasonic input unit 958. The touch panel 952 may recognize a touch input using at least one of capacitive, resistive, infrared and ultrasonic detecting methods. The touch panel 952 may further include a control circuit. In the case of using the capacitive detecting method, a physical contact or proximity recognition is possible. The touch panel 952 may further include a tactile layer. In this case, the touch panel 952 may provide a tactile reaction to a user. The touch panel 952 may generate a touch event associated with execution of a specific function using position associated information.

The (digital) pen sensor 954 may be implemented in a similar or same manner as the method of receiving a touch input of a user or may be implemented using an additional sheet for recognition. The key 956 may include, for example, a physical button, an optical key, or a keypad. The ultrasonic input device 958, which is an input device for generating an ultrasonic signal, may enable the electronic device 900 to detect a sound wave through a microphone (e.g., a microphone module MIC, collecting first audio data using a portion of a plurality of microphones and collecting second audio data using the plurality of microphones) so as to identify data, wherein the ultrasonic input device 958 is capable of wireless recognition. According to an embodiment the present disclosure, the electronic device 900 may use the communication module 920 so as to receive a user input from an external device (e.g., a computer or server) connected to the communication module 920.

The display 960 (e.g., the display 140) may include a panel 962, a hologram device 964, or a projector 966. The panel 962 may be a LCD or an active-matrix organic light-emitting diode (AMOLED). The panel 962 may be, for example, flexible, transparent or wearable. The panel 962 and the touch panel 952 may be integrated into a single module. The hologram device 964 may display a stereoscopic image in a space using a light interference phenomenon. The projector 966 may project light onto a screen so as to display an image. The screen may be arranged in the inside or the outside of the electronic device 200. According to various embodiments of the present disclosure, the display 960 may further include a control circuit for controlling the panel 962, the hologram device 964, or the projector 966.

The interface 970 may include, for example, a high-definition multimedia interface (HDMI) 972, a universal serial bus (USB) 974, an optical interface 976, or a D-sub (D-subminiature) 978. Additionally or generally, the interface 970 may include, for example, a mobile high definition link (MI-IL) interface, a SD card/multi-media card (MMC) interface, or an infrared data association (IrDA) standard interface.

The audio module 980 may convert a sound and an electric signal in dual directions. At least a portion of the audio module 980 may be included in for example, an input/output interface 140 illustrated in FIG. 1. The audio module 980 may process, for example, sound information that is input or output through a speaker 982, a receiver 984, an earphone 986, a microphone 988, or the like.

According to various embodiments of the present disclosure, the microphone 988 included in the audio module 980 may include a plurality of microphones. A portion (one microphone or microphones of which the number is less than that of the whole microphones) of the plurality of microphones may be used to collect first audio data. In the case where a signal or information corresponding to a specified command is included in the first audio data, all or a portion of the plurality of microphones may be used to collect second audio data. The first audio data and the second audio data may be included in utterance information continuously uttered. Alternatively, the first audio data and the second audio data may be divided into words or meaningful words or by units such as sentence, respiration, and the like.

According to various embodiments of the present disclosure, when a function associated with the second audio data is performed, there may be used at least one of results of executing voice recognition of the first audio data or the second audio data. For example, a function or application may be executed that is mapped onto at least one of first information being a voice recognition result of the first audio data or second information being a voice recognition result of the second audio data. Alternatively, an application that is running may be controlled according to the first information or the second information. With regard to this, the electronic device 100 may manage a function table mapped onto at least one of the first information or the second information.

The camera module 991 for shooting a still image or a video may include at least one image sensor (e.g., a front sensor or a rear sensor), a lens (not illustrated), an image signal processor (ISP, not illustrated), or a flash (e.g., an LED or a xenon lamp, not illustrated).

The power management module 995 may manage power of the electronic device 900. Although not illustrated, the power management module 995 may include, for example, a power management integrated circuit (PMIC) a charger IC, or a battery or fuel gauge.

The PMIC may be mounted on an integrated circuit or a SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method, or an electromagnetic method, and may include an additional circuit, for example, a coil loop, a resonant circuit, or a rectifier, and the like.

The battery gauge may measure, for example, a remaining capacity of the battery 996 and a voltage, current or temperature thereof while the battery is charged. The battery 996 may store or generate electricity, and may supply power to the electronic device 900 using the stored or generated electricity. The battery 996 may include, for example, a rechargeable battery or a solar battery.

The indicator 997 may display a specific state of the electronic device 900 or a part thereof (e.g., the AP 910), such as a booting state, a message state, a charging state, and the like. The motor 998 may convert an electrical signal into a mechanical vibration. Although not illustrated, a processing device (e.g., a GPU) for supporting a mobile TV may be included in the electronic device 900. The processing device for supporting a mobile TV may process media data according to the standards of DMB, digital video broadcasting (DVB) or media flow.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure may be implemented, for example, by instructions stored in a computer-readable storage media in the form of a programmable module. The instruction, when executed by one or more processors (e.g., the processor 910), may perform a function corresponding to the instruction. The computer-readable storage media may be, for example, the memory 930. At least a portion of the programming module may be implemented (e.g., executed), for example, by the processor 910. At least a portion of the programming module may include the following for performing one or more functions: a module, a program, a routine, sets of instructions, a process, or the like.

A computer-readable recording medium may include a hard disk, a magnetic media such as a floppy disk and a magnetic tape, an optical media such as Compact Disc Read Only Memory (CD-ROM) and a DVD, a magneto-optical media such as a floptical disk, and the following hardware devices specifically configured to store and perform a program instruction (e.g., a programming module): Read Only Memory (ROM), Random Access Memory (RAM), and a flash memory. Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

According to a microphone operating method and an electronic device supporting the same, various embodiments of the present disclosure may improve voice recognition performance.

Furthermore, various embodiments of the present disclosure may reduce energy by using power efficiently.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a plurality of microphones operatively coupled to the electronic device;
   one or more processors including an audio codec and a low-power processing module, upon execution of instructions, configured to:
   recognize a specified command through voice recognition of first audio data collected using a first set of the plurality of microphones,
   perform a specified audio process associated with a multi-channel audio signal corresponding to a second set of the plurality of microphones, the second set comprising at least two microphones, a number of microphones in the second set being larger than a number of microphones in the first set, and
   execute a function or an application corresponding to second audio data collected using the second set when the specified command is recognized,
   wherein the recognizing of the specified command is performed by the audio codec of the one or more processors, and
   wherein the one or more processors are further configured to recognize a sound source direction of the multi-channel audio signal based on positions of microphones and adjust a parameter of the multi-channel audio signal so as to adjust an input gain of microphones in a specific direction.

2. The electronic device of claim 1, wherein the one or more processors are further configured to:
   perform voice recognition of the second audio data, and
   execute the function or the application corresponding to the voice recognition result.

3. The electronic device of claim 2,
   wherein a first processor of the one or more processors is configured to operatively couple to a portion of the plurality of microphones, and
   wherein a second processor of the one or more processors is configured to operatively couple to the plurality of microphones.

4. The electronic device of claim 3, wherein the one or more processors are further configured to:
   activate at least one of a remaining microphone of the plurality of microphones other than the portion of the plurality of microphones, or
   recognize the specified command using multi-channel signal processing.

5. The electronic device of claim 2, further comprising at least one of:
   a noise suppressor configured to adjust a parameter of the multi-channel audio signal so as to suppress receiving of a sound source of a specific direction associated with a noise; or
   an echo canceler configured to cancel an echo component included in the multi-channel audio signal.

6. The electronic device of claim 2, wherein the one or more processors are further configured to determine whether the first audio data comprises at least one of utterance character information, or speaker classification information corresponding to the specified command.

7. The electronic device of claim 1, wherein the specified audio process associated with the multi-channel audio signal performed by the audio codec of the one or more processors.

8. The electronic device of claim 1, wherein the specified audio process associated with the multi-channel audio signal performed by an application processor of the one or more processors.

9. A microphone operating method for mobile electronic device comprising:
   collecting first audio data using a first set of a plurality of microphones operatively coupled to an electronic device;
   recognizing a specified command through voice recognition of the first audio data collected using the first set of the plurality of microphones;
   performing a specified audio process associated with a multi-channel audio signal corresponding to a second set of the plurality of microphones, the second set comprising at least two microphones, a number of microphones of the second set being larger than a number of microphones of the first set;
   executing, by one or more processors, a function or an application, corresponding to second audio data collected using the second set of the plurality of microphones when the specified command is recognized,
   wherein the recognizing of the specified command is performed by an audio codec of the one or more processors,
   further comprising:
   determining, by the one or processors, a sound source direction of the multi-channel audio signal, based on positions where microphones; and
   adjusting, by the one or processors, a parameter of the multi-channel audio signal so as to adjust an input gain of microphones of a specific direction.

10. The microphone operating method of claim 9, wherein the executing of the function or the application comprises:
    performing a second voice recognition operation of performing the function or the application, through voice recognition of the second audio data.

11. The microphone operating method of claim 10, further comprising at least one of:
    performing the voice recognition operation by a first processor operatively coupled to a portion of the plurality of microphones; or performing the second voice recognition operation by a second processor operatively coupled to all of the plurality of microphones.

12. The microphone operating method of claim 10, further comprising at least one of:
activating at least one of a remaining microphone of the plurality of microphones other than a portion of the plurality of microphones according to recognition of the specified command; or
processing the multi-channel audio signal according to the recognition of the specified command.

13. The microphone operating method of claim 10, further comprising at least one of:
adjusting a parameter of the multi-channel audio signal so as to suppress receiving of a sound source of a specific direction associated with a noise; or
cancelling an echo component included in the multi-channel audio signal.

14. The microphone operating method of claim 10, wherein the voice recognition operation comprises:
determining whether the first audio data comprises at least one of utterance character information or speaker classification information corresponding to the specified command.

15. The microphone operating method of claim 10, further comprising:
transferring a command, set to process the multi-channel audio signal, to a multi-channel processing module according to the recognition of the specified command or specific audio data.

16. The microphone operating method of claim 10, further comprising at least one of:
setting at least one of a single channel signal processing operation or a multi-channel signal processing operation to an audio codec; or
setting the second voice recognition operation to an audio data processing module.

17. An electronic device comprising:
a plurality of microphones operatively coupled to the electronic device;
one or more processors including an audio codec and a low-power processing module, upon execution of instructions, configured to:
recognize a specified command through voice recognition of first audio data collected using a first set of the plurality of microphones,
perform a specified audio process associated with a multi-channel audio signal corresponding to a second set of the plurality of microphones, the second set comprising at least two microphones, a number of microphones in the second set being larger than a number of microphones in the first set, and
execute a function or an application corresponding to second audio data collected using the second set when the specified command is recognized,
wherein the recognizing of the specified command is performed by the low-power processing module of the one or more processors, and
wherein the one or more processors are further configured to recognize a sound source direction of the multi-channel audio signal based on positions of microphones and adjust a parameter of the multi-channel audio signal so as to adjust an input gain of microphones in a specific direction.

18. The electronic device of claim 17, wherein the specified audio process associated with the multi-channel audio signal performed by the audio codec of the one or more processors.

19. The electronic device of claim 17, wherein the specified audio process associated with the multi-channel audio signal performed by an application processor of the one or more processors.

* * * * *